(12) United States Patent
Kodama et al.

(10) Patent No.: US 10,778,862 B2
(45) Date of Patent: Sep. 15, 2020

(54) INFORMATION PROCESSING SYSTEM, INFORMATION PROCESSING METHOD, AND COMPUTER-READABLE RECORDING MEDIUM

(71) Applicants: Kai Kodama, Kanagawa (JP); Yuusuke Inoue, Kanagawa (JP)

(72) Inventors: Kai Kodama, Kanagawa (JP); Yuusuke Inoue, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/353,854

(22) Filed: Mar. 14, 2019

(65) Prior Publication Data
US 2019/0289159 A1    Sep. 19, 2019

(30) Foreign Application Priority Data

Mar. 19, 2018 (JP) .................................. 2018-051819
Aug. 9, 2018 (JP) .................................. 2018-150859

(51) Int. Cl.
*H04N 1/00* (2006.01)
*G06F 9/455* (2018.01)
*G06F 9/451* (2018.01)

(52) U.S. Cl.
CPC ......... *H04N 1/00949* (2013.01); *G06F 9/455* (2013.01); *H04N 1/0035* (2013.01);
(Continued)

(58) Field of Classification Search
CPC .................. H04N 1/00949; H04N 1/00474
See application file for complete search history.

(56) References Cited

U.S. PATENT DOCUMENTS

2012/0050802 A1* 3/2012 Masuda ............. H04N 1/00209
358/1.15
2015/0264129 A1* 9/2015 Takeuchi ............. H04L 67/1044
709/205
(Continued)

FOREIGN PATENT DOCUMENTS

| JP | 2017-76368 A | 4/2017 |
|---|---|---|
| JP | 2018-014079 | 1/2018 |
| JP | 2019-164742 A | 9/2019 |

OTHER PUBLICATIONS

U.S. Appl. No. 15/752,317, filed Feb. 13, 2018.
Extended European Search Report dated Jul. 22, 2019 in European Patent Application No. 19161141.7, 9 pages.

*Primary Examiner* — Ibrahim Siddo
(74) *Attorney, Agent, or Firm* — Oblon, McClelland, Maier & Neustadt, L.L.P.

(57) ABSTRACT

According to an embodiment, an information processing system includes a device, and a service providing system. The device includes predetermined functions. The service providing system executes an application having execution order of programs defined therefor so as to execute a processing flow using one or more of the predetermined functions. The service providing system includes a management unit, and a screen configuring unit. The management unit generates application information having metadata information and the application associated with each other, the metadata information being associated with a user who uses the application and used when the application is executed. The screen configuring unit generates, when the application is executed, based on the application information, a user interface that receives setup operation related to metadata corresponding to the metadata information in the application.

10 Claims, 26 Drawing Sheets

(52) U.S. Cl.
CPC ....... *H04N 1/0097* (2013.01); *H04N 1/00204* (2013.01); *H04N 1/00411* (2013.01); *H04N 1/00474* (2013.01); *G06F 9/451* (2018.02); *H04N 1/00408* (2013.01); *H04N 1/00501* (2013.01); *H04N 2201/0094* (2013.01)

(56) References Cited

U.S. PATENT DOCUMENTS

| | | |
|---|---|---|
| 2016/0182747 A1 | 6/2016 | Zahorán et al. |
| 2017/0109194 A1* | 4/2017 | Namihira ............ G06F 9/45512 |
| 2017/0171413 A1 | 6/2017 | Kim et al. |
| 2017/0331969 A1 | 11/2017 | Ogawa et al. |
| 2018/0013913 A1 | 1/2018 | Hayashi et al. |
| 2018/0343352 A1 | 11/2018 | Hayashi et al. |
| 2019/0289159 A1 | 9/2019 | Kodama et al. |

* cited by examiner

| DATA TYPE BEFORE CONVERSION | DATA TYPE AFTER CONVERSION | TYPE CONVERSION GENERATED |
|---|---|---|
| InputStream | LocalFilePath | FIRST TYPE CONVERSION |
| LocalFilePath | File | SECOND TYPE CONVERSION |
| ... | ... | ... |

FIG.10

REGISTRATION OF APPLICATION — G300

| TYPE SELECTION | BASIC SETUP | ADVANCED SETUP | SCAN SETUP | REGISTRATION |

■PLEASE SET DEFAULT VALUES FOR SCAN   G310   G320

SETTABILITY

- SHEET ORIENTATION: READABLE ORIENTATION ✓
- SINGLE SIDE OR DOUBLE SIDE: DOUBLE SIDE ☐
- READ COLOR MODE: AUTOMATIC SELECTION ☐
- READ RESOLUTION: 300 dpi ✓
- READ SIZE: Auto ✓

[NEXT] — G350

FIG.11

REGISTRATION OF APPLICATION — G400

| TYPE SELECTION | BASIC SETUP | ADVANCED SETUP | PRINT SETUP | REGISTRATION |

■PLEASE SET DEFAULT VALUES FOR PRINT   G410   G420

SETTABILITY

- NUMBER OF PRINTED COPIES: 1 ✓
- PRINT COLOR MODE: MONOCHROME ☐
- PRINTED SIDE: SINGLE SIDE ☐

[NEXT] — G450

FIG.12

```
{
    "type": "scan",
    "name": test",
    "displayName":{
                "en": "test",
                "ja": "TEST"
    },
    "description":{

},
    "loginType": "none",
    "status": "change_published",
    "views": [
        {
                        "name": "test1",
                        "flowName": "test_flow",
                        "viewTemplateName": "onescreen",
                        "defaultParameters": {
                                    "process": {

},
                                    "divideByPageNumbers": {

}
                        },
                        "userInputParameters": {
                                    "process": [],
                                    "divideByPageNumbers": [
                                                {
                                                            "name": "divisionPageRange",
                                                            "displayName": {
                                                                        "en": "divisionPageRange",
                                                                        "ja": "divisionPageRange"
                                                            },
                                                            "description": {

},
                                                            "inputType": "text",
                                                            "options" [],
                                                            "required": true,
                                                            "validation": null
                                                },
                                                {
                                                            "name": "divisionPageNumbers",
                                                            "displayName": {
                                                                        "en": "divisionPageNumbers",
                                                                        "ja": "divisionPageNumbers"
                                                            },
                                                            "description": {

},
                                                            "inputType": "text",
                                                            "options" [],
                                                            "required": true,
```

1200

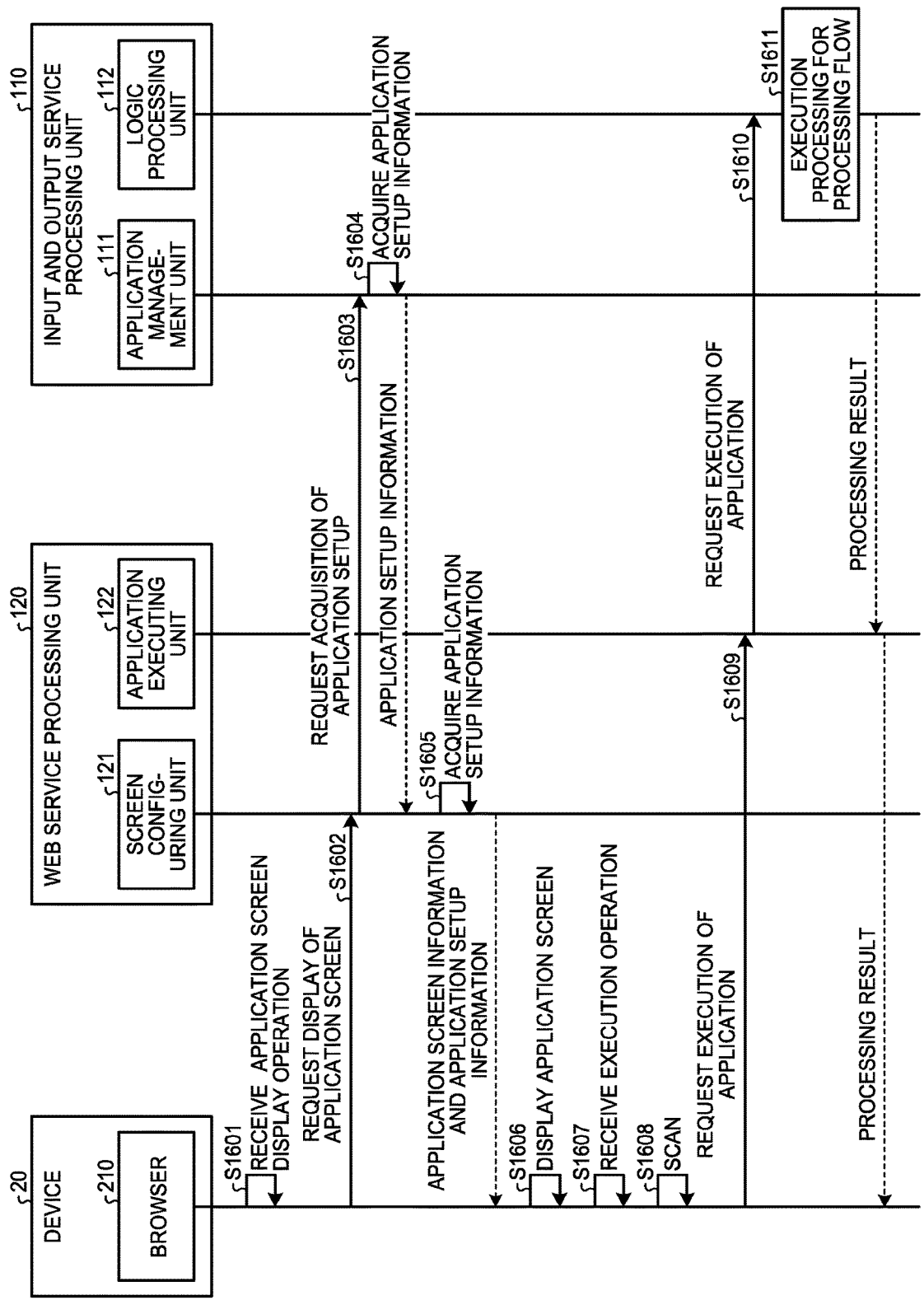

FIG.16

| filename | date | Modified by | category | ... | notes |
|---|---|---|---|---|---|
| aaa.pdf | 2017/4/5 | Taroh | Internal document | | |
| bbb.pdf | 2017/4/5 | Jiroh | external document | | |
| ccc.pdf | 2017/4/7 | Taroh | external document | | Sensitive Personal Information, Please handleitaccordinaly |
| ... | | | | | |

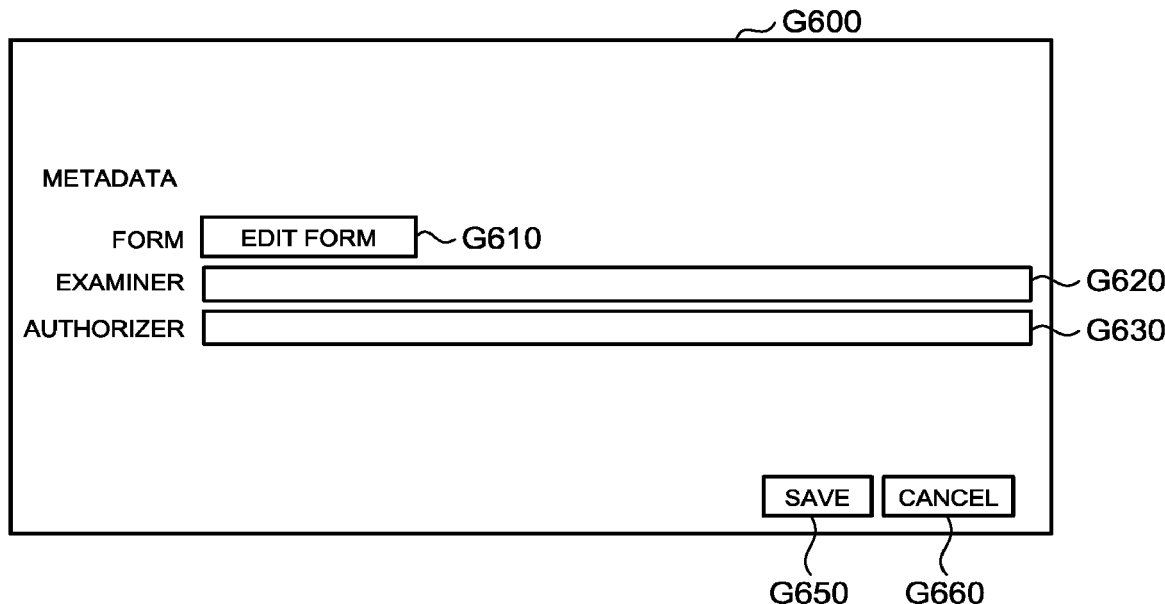

FIG.21

```
                            ⌠2600
"supplies": {

"punch": {

"status": "string"

},

"staple": {

"status": "string"

},

"toners": [

{

"color": "string",

"remain": 0,

"status": "string"

}

],

"updatedAt": "2017-10-25T05:05:03.576Z",

"wasteToner": {

"status": "string"

}

},
```

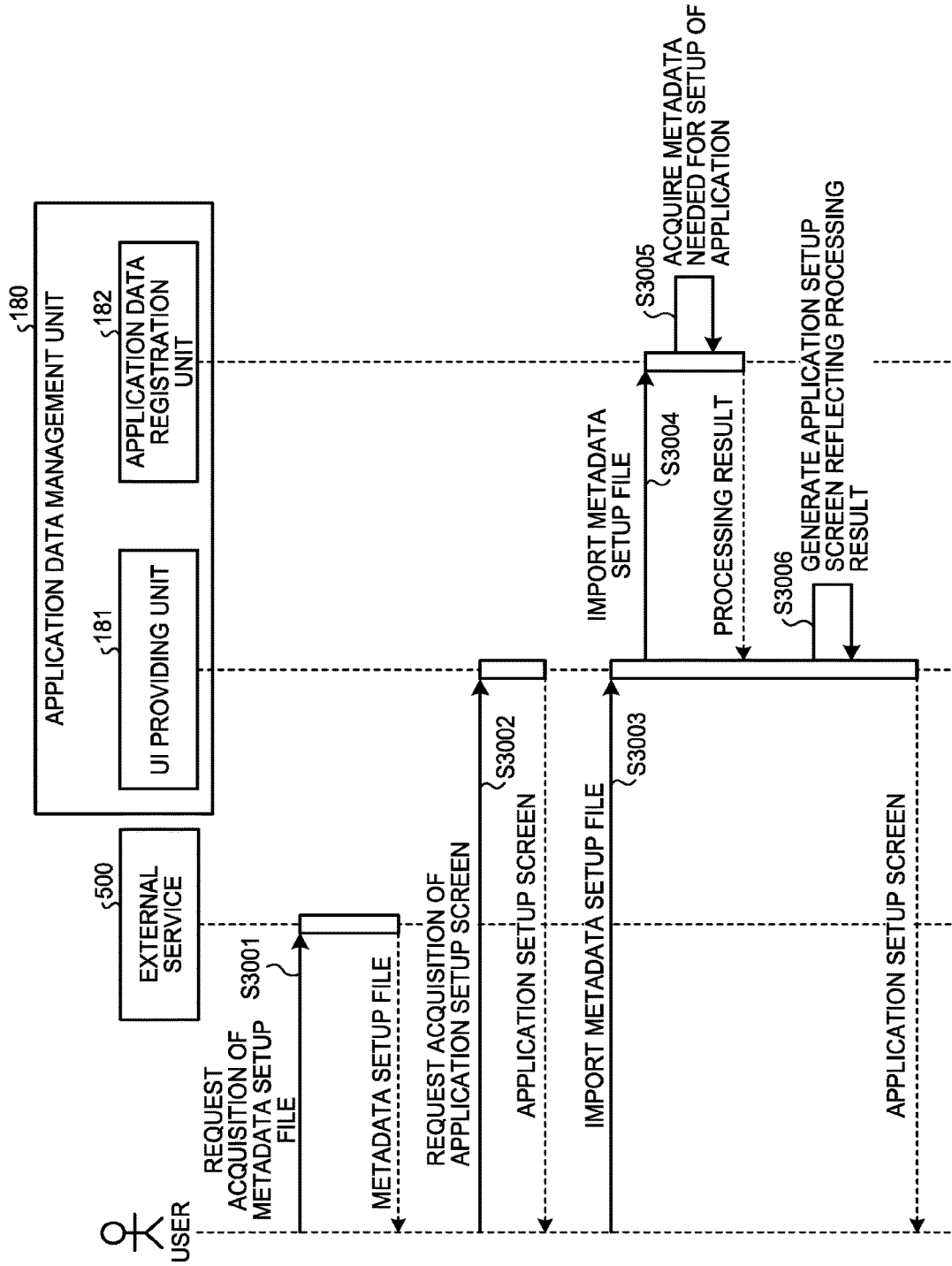

FIG.25

```
2700
{
  "name": null,
  "displayName": null,
  "description": null,
  "inputType": null,
  "options": null,
  "optionChangeEnabled": null,
  "fields": [
    {
      "name": "category",
      "inputType": "userInput",
      "inputContent": {
        "userInput": {
          "name": null,
          "displayName": {
            "ja": " category "
          },
          "description": null,
          "inputType": "select",
          "options": [
            {
              "value": " internal document ",
              "displayName": {
                "ja": "internal document"
              }
            },
            {
              "value": " external document ",
              "displayName": {
                "ja": "external document"
              }
            }
          ],
          "optionChangeEnabled": null,
          "required": false,
          "format": null,
          "validation": null,
          "boilerplates": null
        },
        "default": " internal document "
      }
    },
    {
      "name": "notes",
      "inputType": "userInput",
      "inputContent": {
        "userInput": {
          "name": null,
          "displayName": {
            "ja": " notes "
          },
          "description": null,
          "inputType": "text",
          "options": null,
```

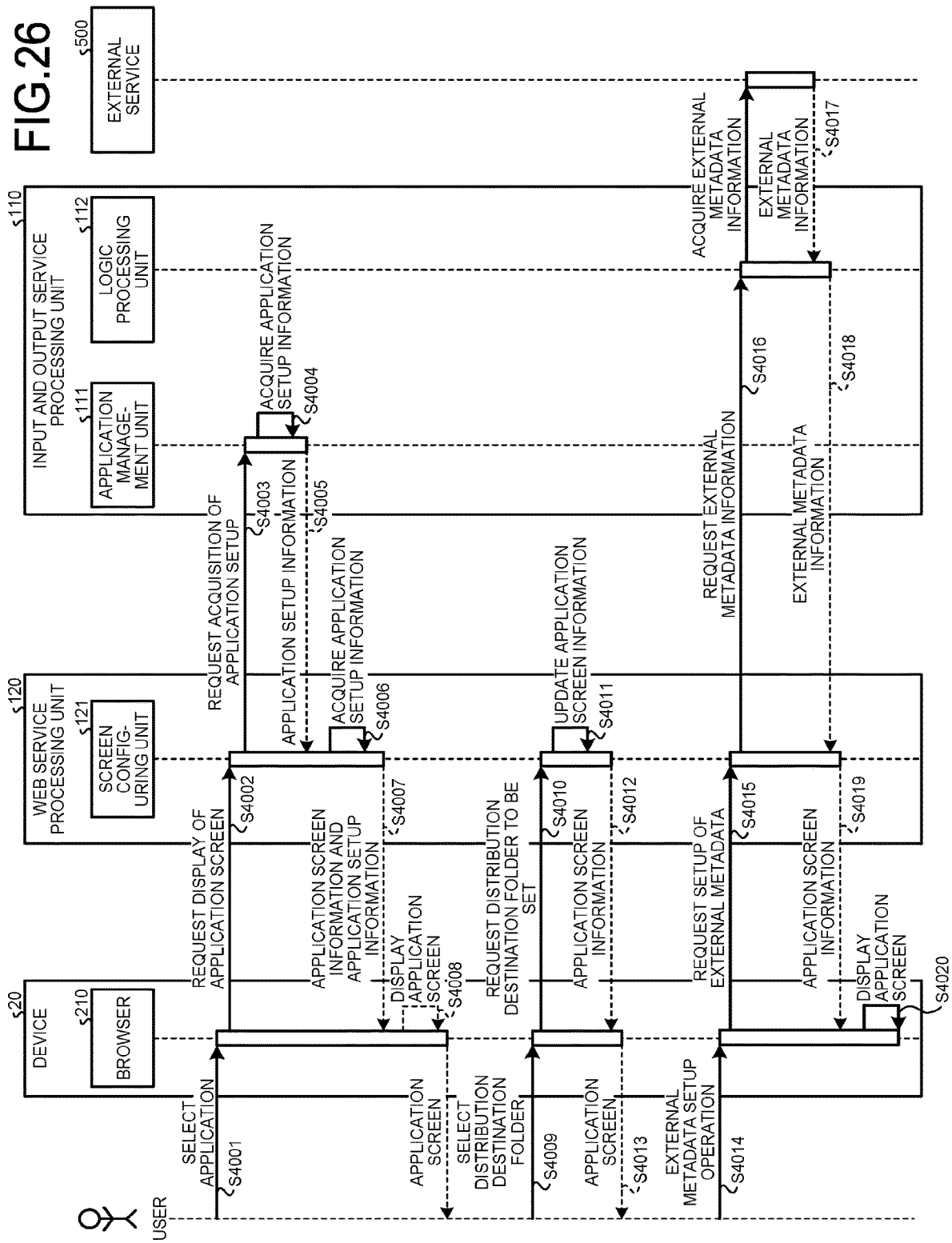

FIG.28

| Healthcare | | | | | |
|---|---|---|---|---|---|
| Name ˅ | Modified ˅ | Modified By ˅ | PatientID ˅ | Department ˅ | DocumentType ˅ |
| ⬚ ⋯ | April 19 | user2 | | | |
| ⬚ ⋯ | May 20 | user2 | | | |
| ⬚ 111111.pdf | March 21 | user2 | 1234567890!!!! | Wound Dermatology | Emergency Report |
| ⬚ 12334.pdf | October 6, 2017 | user2 | 12334 | Emergency Department | Admission Summary |
| ⬚ 12334-20171006185346.pdf | October 6, 2017 | user2 | 12334 | Emergency Department | Home Care Report |
| ⬚ AAAA.png | May 29 | user2 | 12345 | Burm Department | Emergency Report |

+ Add colu⋯

- Home
- Notebook
- Documents
- Pages
- Healthcare
- Invoice
- HumanResources
- ComponentTest
- KondoTest
- MultipleLineTest
- Site contents
- Recycle bin
- Edit

G1010, G1020, G1030, G1050, G1060, G1070, G1000

INFORMATION PROCESSING SYSTEM, INFORMATION PROCESSING METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2018-051819, filed on Mar. 19, 2018 and Japanese Patent Application No. 2018-150859, filed on Aug. 9, 2018. The contents of which are incorporated herein by reference in their entirety.

BACKGROUND OF THE INVENTION

1. Field of the Invention

The present invention relates to an information processing system, an information processing method, and a computer-readable recording medium.

2. Description of the Related Art

Service for providing a combination of plural functions (for example, scanning, printing, and e-mail distributing functions) has come to attention recently. For example, known is service where an electronic file (image file) generated by scanning is distributed by e-mail after predetermined processing has been performed on the electronic file. Such service is realized by execution, as sequential processing, of one or more types of processing each realizing a function.

For example, disclosed for the purpose of supporting development of an application for executing sequential processing (a processing flow) where functions of a device, such as a multifunction peripheral (MFP), are used is a system that enables a user to use an application that executes a processing flow desired by the user when the user operates the device, by a service providing system generating the application, based on information input by the user via an information processing apparatus, such as a PC terminal, and registering the generated application in the device (Japanese Unexamined Patent Application Publication No. 2018-014079). By using such a system, even a user who does not have expert knowledge and experience of any programming language is able to easily generate and use an application that executes a desired processing flow.

For example, with an application for transmitting a file (for example, scan data) that has been subjected to predetermined processing, to external service (for example, cloud storage), one may want to transmit the file with metadata attached to the file. Since metadata differ from external service to external service, or from user to user, a user needs to perform setup related to an application and metadata flexibly.

In view of the above, there is a need to enable, in a system that executes a processing flow where functions of a device are used, flexible setup related to metadata used in an application that executes the processing flow.

SUMMARY OF THE INVENTION

According to an embodiment, an information processing system includes a device, and a service providing system. The device includes predetermined functions. The service providing system executes an application having execution order of programs defined therefor so as to execute a processing flow using one or more of the predetermined functions. The service providing system includes a management unit, and a screen configuring unit. The management unit generates application information having metadata information and the application associated with each other, the metadata information being associated with a user who uses the application and used when the application is executed. The screen configuring unit generates, when the application is executed, based on the application information, a user interface that receives setup operation related to metadata corresponding to the metadata information in the application.

BRIEF DESCRIPTION OF THE DRAWINGS

FIG. 6 is a diagram illustrating an example of a type conversion information table according to the embodiment;

FIG. 10 is a diagram illustrating an example of a second application registration screen according to the embodiment;

FIG. 11 is a diagram illustrating an example of a third application registration screen according to the embodiment;

FIG. 12 is a diagram illustrating an example of a data structure of application setup information, according to the embodiment;

FIG. 13 is a sequence diagram illustrating an example of overall processing upon use of an application registered in the service providing system, according to the embodiment;

FIG. 16 is a diagram illustrating an example of a data structure of metadata in external service according to the embodiment;

FIG. 19 is a diagram illustrating an example of a first application setup screen according to the embodiment;

FIG. 20 is a diagram illustrating an example of a second application setup screen according to the embodiment;

FIG. 21 is a diagram illustrating an example of metadata structure setup according to the embodiment;

FIG. 24 is a sequence diagram illustrating an example of metadata structure registration processing according to a second modified example of the embodiment;

FIG. 25 is a diagram illustrating an example of a data structure of processing result information upon import of a metadata setup file, according to the second modified example of the embodiment;

FIG. 26 is a sequence diagram illustrating an example of metadata setup processing upon execution of an application, according to a third modified example of the embodiment;

FIG. 28 is a diagram illustrating an example of an external service screen representing a metadata structure in external service, according to the third modified example of the embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
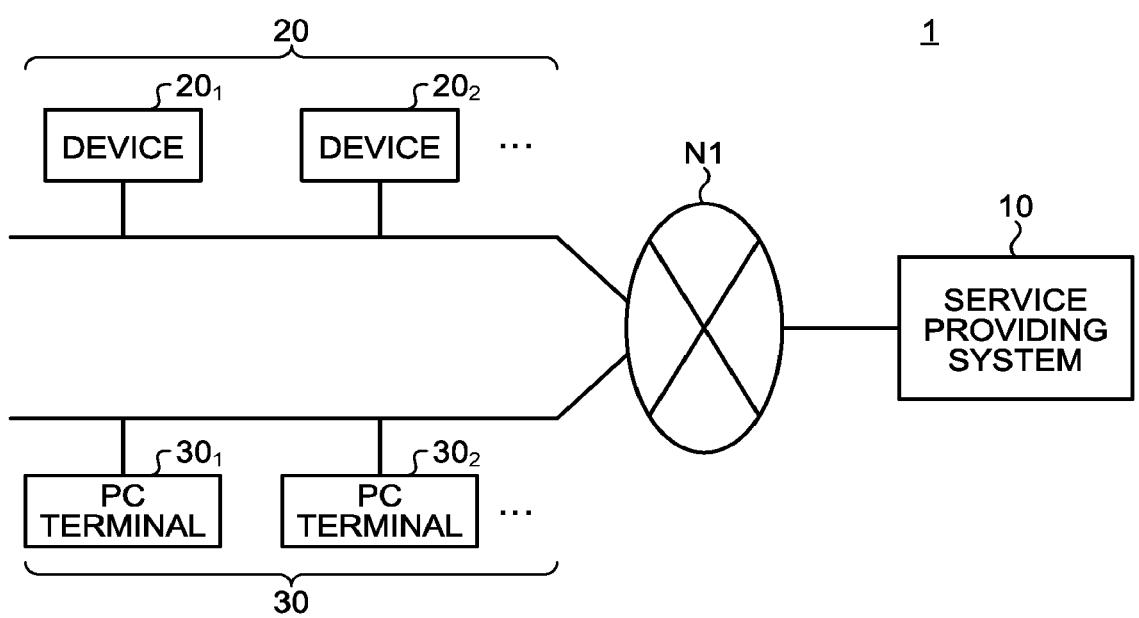
FIG. 1 is a diagram illustrating a system configuration of an example of an information processing system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, by reference to the appended drawings, an embodiment of an information processing system, an information processing method, and a computer-readable recording medium will be described in detail. The present invention is not limited through the following embodiment, and components in the following embodiment include any component that is able to be conceived easily by a person skilled in the art, any component that is substantially the same, and any component in the so-called equivalent scope. Various omissions, substitutions, modifications, and combinations of the components without departing from the gist of the following embodiment may be implemented.

Hereinafter, an embodiment of the present invention will be described in detail, while reference is made to the drawings.

System Configuration

First of all, a system configuration of an information processing system 1 according to the embodiment will be described while reference is made to FIG. 1. FIG. 1 is a diagram illustrating a system configuration of an example of the information processing system 1 according to the embodiment.

The information processing system 1 illustrated in FIG. 1 includes a service providing system 10, devices 20, and PC terminals 30, and these are communicatably connected via a wide area network N1, such as the Internet.

The service providing system 10 is realized by one or more information processing apparatuses, and provides various types of service via the network N1, each of the types of service being realized by sequential processing that is a combination of one or more of plural types of processing respectively realizing various functions.

The functions include functions related to electronic files, such as document files and image files. Examples of the functions include: printing, scanning, facsimile transmission, data format conversion, e-mail transmission, transmission of data other than e-mails, optical character recognition (OCR) processing, processing, compression and decompression, and storage into a repository.

Specific examples of service provided by the service providing system 10 according to the embodiment will be described later. Hereinafter, the sequential processing may also be referred to as the "processing flow".

The devices 20 are various electronic devices used by users. That is, the devices 20 may be, for example, any of: an image forming apparatus, such as an MFP; a personal computer (PC); a projector; an electronic blackboard; and a digital camera. Users are able to use the various types of service provided by the service providing system 10 by using various functions that the devices 20 have.

Hereinafter, when the plural devices 20 are distinguished from one another, the devices 20 will be referred to as a "device $20_1$", a "device $20_2$", and so on by use of subscripts.

The PC terminals 30 may be, for example, any of: a desktop PC; a notebook PC; a smartphone; and a tablet terminal, which are used by users. A user is able to use the various types of service provided by the service providing system 10 by using the PC terminal 30.

Hereinafter, when the plural PC terminals 30 are distinguished from one another, the PC terminals 30 will be referred to as a "PC terminal $30_1$", a "PC terminal $30_2$", and so on by use of subscripts.

Furthermore, the configuration of the information processing system 1 illustrated in FIG. 1 is just an example, and any other configuration may be adopted therefor. For example, the information processing system 1 according to the embodiment may include various devices that perform at least one of input and output of electronic data, and these devices may use the various types of service provided by the service providing system 10.

Hardware Configuration

Next, a hardware configuration of the service providing system 10 and the PC terminal 30 that are included in the information processing system 1 according to the embodiment will be described while reference is made to FIG. 2.

Figure 2:
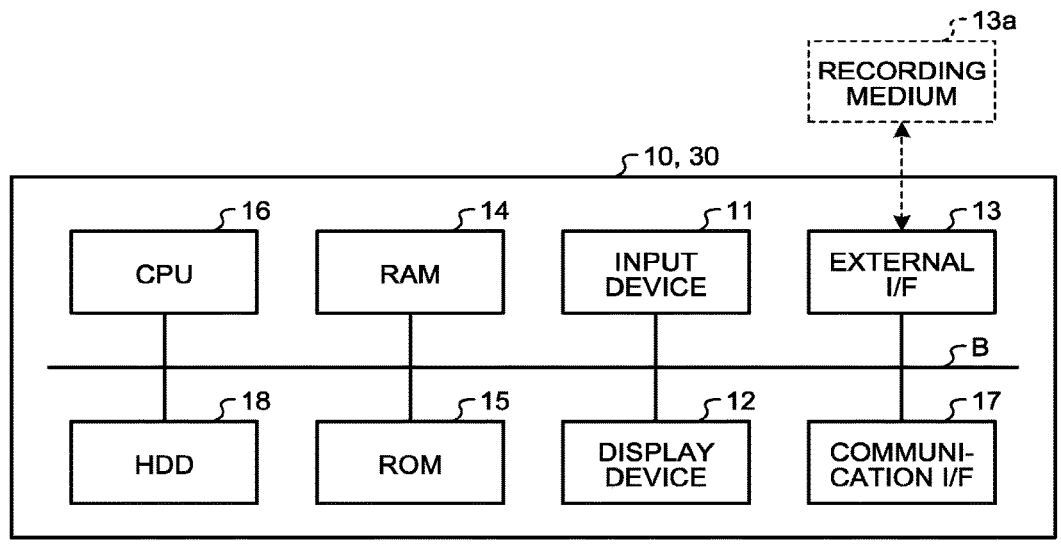
FIG. 2 is a diagram illustrating a hardware configuration of an example of a service providing system and a PC terminal, according to the embodiment.

FIG. 2 is a diagram illustrating a hardware configuration of an example of the service providing system 10 and the PC terminal 30, according to the embodiment. Since hardware configurations of the service providing system 10 and the PC terminal 30 are similar to each other, hereinafter, the hardware configuration of the service providing system 10 will be described mainly.

The service providing system 10 illustrated in FIG. 2 has an input device 11, a display device 12, an external I/F 13, and a random access memory (RAM) 14. Furthermore, the service providing system 10 has a read only memory (ROM) 15, a central processing unit (CPU) 16, a communication I/F 17, and a hard disk drive (HDD) 18. These pieces of hardware are connected to one another via a bus B.

The input device 11 may be a keyboard and a mouse, a touch panel, or the like, and is used for a user to input operation signals therethrough. The display device 12 includes a display, and displays thereon results of processing by the service providing system 10. At least one of the input device 11 and the display device 12 may be configured to be connected to the service providing system 10 and used when needed.

The communication I/F 17 is an interface that connects the service providing system 10 to the network N1. As a result, the service providing system 10 is able to perform communication via the communication I/F 17.

The HDD 18 is a non-volatile storage device that stores therein programs and data. The programs and data stored in the HDD 18 include an operating system (OS) that is basic software that controls the whole service providing system 10, and application software that provides various functions on the OS.

The service providing system 10 may use, instead of the HDD 18, a drive device (for example, a solid state drive: SSD) that uses a flash memory as a storage medium. Furthermore, the HDD 18 is for management of the stored programs and data through a predetermined file system and/or a DB.

The external I/F 13 is an interface to an external device. The external device includes a recording medium 13a. As a result, the service providing system 10 is able to read from and write into the recording medium 13a via the external I/F 13. The recording medium 13a may be a flexible disc, a CD, a DVD, an SD memory card, or a USB memory.

The ROM 15 is a non-volatile semiconductor memory that is able to hold therein programs and data even if the power is turned off. The ROM 15 has, stored therein, programs and data, such as a Basic Input/Output System (BIOS) executed when the service providing system 10 is started, OS setup, and network setup. The RAM 14 is a volatile semiconductor memory that temporarily holds therein programs and data.

The CPU 16 is an arithmetic device that realizes control and functions of the whole service providing system 10 by reading the program and data from the storage devices, such as the ROM 15 or the HDD 18, into the RAM 14 and executing processing.

The service providing system 10 and the PC terminal 30 according to the embodiment are able to realize various types of processing described later, by having the hardware configuration illustrated in FIG. 2.

Figure 3:
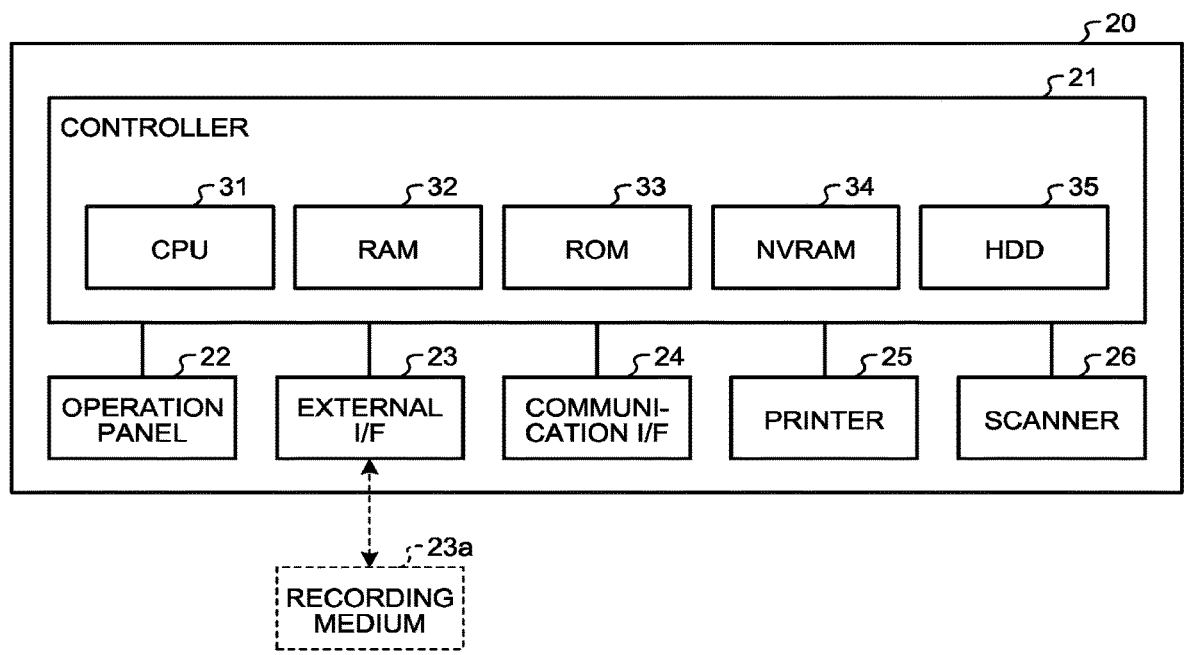
FIG. 3 is a diagram illustrating a hardware configuration of an example of a device according to the embodiment.

Next, a hardware configuration of the device 20 included in the information processing system 1 according to the embodiment when the device 20 is an image forming apparatus will be described while reference is made to FIG. 3. FIG. 3 is a diagram illustrating a hardware configuration of an example of the device 20 according to the embodiment.

The device 20 illustrated in FIG. 3 has a controller 21, an operation panel 22 (an operating unit), an external I/F 23, a communication I/F 24, a printer 25, and a scanner 26. Furthermore, the controller 21 has a CPU 31, a RAM 32, a ROM 33, an NVRAM 34, and an HDD 35.

The ROM 33 is a non-volatile semiconductor memory that stores therein various programs and data. The RAM 32 is a volatile semiconductor memory that temporarily holds therein programs and data. The NVRAM 34 stores therein, for example, setup information. Furthermore, the HDD 35 is a non-volatile storage device that stores therein various programs and data.

The CPU 31 is an arithmetic device that realizes control and functions of the whole device 20 by reading the programs and data, and the setup information, from the ROM 33, NVRAM 34, or HDD 35, into the RAM 32, and executing processing.

The operation panel 22 includes an input unit that receives input from a user, and a display unit that performs display. The external I/F 23 is an interface to an external device. The external device may be a recording medium 23a. As a result, the device 20 is able to read from and/or write into the recording medium 23a via the external I/F 23. The recording medium 23a may be, for example, an IC card, a flexible disc, a CD, a DVD, an SD memory card, or a USB memory.

The communication I/F 24 is an interface that connects the device 20 to a network. As a result, the device 20 is able to perform communication via the communication I/F 24. The printer 25 is a printing device that prints out print data. The scanner 26 is a reading device that reads a document and generates an electronic file (image file).

By having the hardware configuration illustrated in FIG. 3, the device 20 according to the embodiment is able to realize various types of processing described later.

Service Provided by Service Providing System

The service provided by the service providing system 10 according to the embodiment will now be described. Hereinafter, description will be made on the assumption that the device 20 is an image forming apparatus.

By executing, based on information input by a user, sequential processing (a processing flow) using functions of the device 20, the service providing system 10 according to the embodiment realizes various types of service. Furthermore, the service providing system 10 generates an application having execution order of programs defined therefor such that a processing flow set by a user is executed, and enables the user to use the application corresponding to the service via the operating unit (the operation panel 22) of the device 20.

After adding a QR code to an electronic file of a document scanned by the device 20, the service providing system 10 according to the embodiment provides "QR code printing service" for printing the electronic file added with the QR code. That is, the service providing system 10 generates a "QR code printing application" that executes a processing flow for realizing the QR code printing service, and enables the user to use the QR code printing application via the operating unit of the device 20. Furthermore, an application for transmitting (accumulating) an electronic file generated by scanning, to external service, such as cloud storage, is usable as an application related to the "QR code printing application".

The service provided by the service providing system 10 is not limited to that described above, and may be, for example: "scan translation service" for transmitting data by e-mail, the data having been obtained by OCR processing on an electronic file generated by scanning and translation thereof into a predetermined language; "encrypted data transmission service" for transmitting an electronic file by e-mail, the electronic file having been generated by scanning and encrypted; or "scan data uploading service" for upload of image data acquired by scanning to a cloud system (external service). In that case, the service providing system 10 generates, based on setup information input by a user: a "scan translation application" that executes a processing flow for realizing the scan translation service; an "encrypted data transmission application" that executes a processing flow for realizing the encrypted data transmission service; or a "scan data uploading application" that executes a processing flow for realizing the scan data uploading service, and the service providing system 10 enables the user to use the generated application.

Functional Configuration

Figure 4:
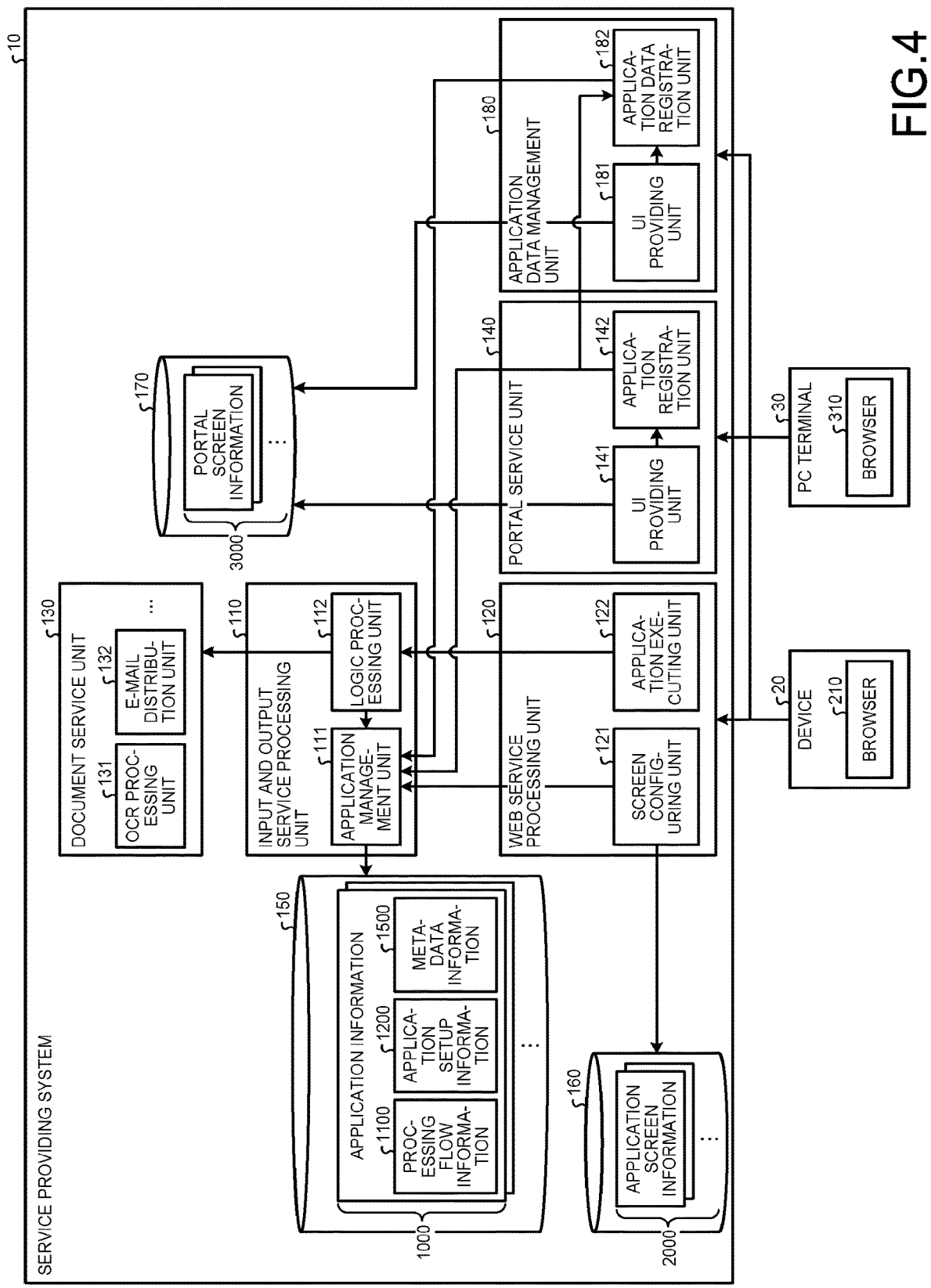
FIG. 4 is a diagram illustrating a functional configuration of an example of the information processing system according to the embodiment.

Next, a functional configuration of the information processing system 1 according to the embodiment will be described while reference is made to FIG. 4. FIG. 4 is a diagram illustrating a functional configuration of an example of the information processing system according to the embodiment.

The PC terminal 30 illustrated in FIG. 4 has a browser 310 executed by, for example, the CPU 16. A user of the PC terminal 30 is able to register applications for using the various types of service, such as the "QR code printing service", by using the browser 310.

The device 20 illustrated in FIG. 4 has a browser 210 executed by, for example, the CPU 31. A user of the device 20 is able to use the various types of service, such as the "QR code printing service", by using the browser 210. That is, as long as the device 20 has the browser 210, the device 20 does not need to have, for example, dedicated application programs for using the various types of service provided by the service providing system 10.

The service providing system 10 illustrated in FIG. 4 has an input and output service processing unit 110, a Web service processing unit 120, a document service unit 130, a portal service unit 140, and an application data management unit 180. These functional units are realized by processing that one or more programs installed in the service providing system 10 causes/causes the CPU 16 to execute.

Furthermore, the service providing system 10 has an application information storage unit 150, an application screen information storage unit 160, and a portal screen information storage unit 170. These storage units are able to be realized by use of the HDD 18. At least one of these storage units may be realized by use of a storage device connected to the service providing system 10 via a network.

The input and output service processing unit 110 performs processing related to the service provided by the service providing system 10. The input and output service processing unit 110 has an application management unit 111 and a logic processing unit 112.

The application management unit 111 manages application information 1000 stored in the application information storage unit 150. The application information 1000 is an application having execution order of programs defined therefor such that a processing flow for providing service is executed. In other words, the various types of service provided by the service providing system 10 are provided through the application information 1000.

Furthermore, the application management unit 111 sends back processing flow information 1100 included in the application information 1000, in response to a request from the logic processing unit 112. The processing flow information 1100 is information defining sequential processing realizing the service provided through the application information 1000.

Furthermore, the application management unit 111 stores the application information 1000 in the application information storage unit 150, according to a request from the portal service unit 140. As a result, the application information 1000 (application) that provides the service is registered in the service providing system 10.

According to a request from the Web service processing unit 120, the logic processing unit 112 acquires, from the application management unit 111, the processing flow information 1100 included in the application information 100. Based on the processing flow information 1100 acquired from the application management unit 111, the logic processing unit 112 then executes sequential processing (a processing flow) realizing the service provided through the application information 1000. As a result, the service providing system 10 according to the embodiment is able to provide various type of service, such as "device information transmission service". Details of the logic processing unit 112 will be described later.

The Web service processing unit 120 performs processing to allow a user to use the various types of service by using the browser 210 of the device 20. That is, the Web service processing unit 120 functions as an application server that provides a Web application (application information 1000) to the browser 210. The Web service processing unit 120 has a screen configuring unit 121 and an application executing unit 122.

In response to a request from the browser 210, the screen configuring unit 121 sends back application screen information 2000 stored in the application screen information storage unit 160, and application setup information 1200 included in the application information 1000 stored in the application information storage unit 150.

The application screen information 2000 is information defining a template of a screen (application screen) for use of the service provided through the application information 1000. The application screen information 2000 is information defining a template of an application screen in, for example, HyperText Markup Language (HTML), Extensible HyperText Markup Language (XHTML), Cascading Style Sheets (CSS), or JavaScript (registered trademark).

Furthermore, the application setup information 1200 is information defining various types of setup for the application (application information 1000). For example, among parameter information used in execution of sequential processing, the application setup information 1200 defines parameter information input by a user, and parameter information set up by default. Furthermore, for example, the application setup information 1200 defines: input items for a user to input parameter information on an application screen; and display information (for example, the application name) on the application screen. The application setup information 1200 is information defining various types of setup for the application in, for example, JavaScript Object Notation (JSON).

As a result, the application screen for use of the service provided by the service providing system 10 is displayed on the device 20 by the browser 210.

According to a request from the browser 210, the application executing unit 122 transmits a request for executing an application (application information 1000), to the input and output service processing unit 110.

The document service unit 130 executes predetermined processing included in sequential processing (a processing flow) based on the processing flow information 1100. The document service unit 130 has, for example, an OCR processing unit 131 and an e-mail distribution unit 132.

The OCR processing unit 131 performs OCR processing on an electronic file. The e-mail distribution unit 132 generates an e-mail attached with the electronic file, and transmits the e-mail to a specified e-mail address.

The document service unit 130 may include, in addition to these functional units, various functional units, such as, for example, a compression and decompression processing unit for compressing or decompressing the electronic file, and a data format conversion unit for converting a data format of the electronic file.

The portal service unit 140 performs processing, such as input of setup information for a user to perform registration of an application by using the browser 310 of the PC terminal 30. The portal service unit 140 has a UI providing unit 141 and an application registration unit 142.

In response to a request from the browser 310, the UI providing unit 141 sends back portal screen information 3000 stored in the portal screen information storage unit 170. A portal sent back then is a Web site that enables registration of an application by use of the browser 310.

The portal screen information 3000 is information defining various screens including a top screen for the portal (portal top screen) and an application registration screen. The portal screen information 3000 is information defining various screens for the browser 210 in, for example, HTML, XML, CSS, or JavaScript.

As a result, the portal top screen and the application registration screen are displayed on the PC terminal 30 by the browser 310. Therefore, a user of the PC terminal 30 is able to input setup information for generation and registration of an application (application information 1000) on the application registration screen.

According to a request from the UI providing unit 141, the application registration unit 142 requests the application management unit 111 to register the application (application information 1000). That is, the application registration unit 142 requests the application management unit 111 to register the application, when registration operation for the application is performed on the application registration screen.

The application data management unit 180 performs processing for associating the user with metadata information 1500 and processing for associating the application with the metadata information 1500. The application data management unit 180 has a UI providing unit 181 and an application data registration unit 182.

In response to a request from the browser 310, the UI providing unit 181 sends back the portal screen information 3000 stored in the portal screen information storage unit 171. The portal screen information 3000 sent back then is a Web site that enables registration of metadata by use of the browser 310.

The portal screen information 3000 is information defining a top screen for a portal (a portal top screen) and a screen for setting up a metadata structure. The portal screen information 3000 is information defining various screens for the browser 210 in, for example, HTML, XML, CSS, or JavaScript.

As a result, the portal top screen and the screen for setting up metadata are displayed on the PC terminal 30 by the browser 310. Therefore, the user is able to perform operation of setting up a metadata structure via a user interface by use of the PC terminal 30.

According to a request from the UI providing unit 181, the application data registration unit 182 requests the application management unit 111 to set up a metadata structure.

The application information storage unit 150 stores therein the application information 1000. The application information 1000 is stored in the application information storage unit 150, in association with an application ID identifying the application information 1000. The application ID is, for example, a uniform resource locator (URL) of the application information 1000, or identification information included in the URL of the application information 1000.

The application information 1000 includes the processing flow information 1100, the application setup information 1200, and the metadata information 1500, in association with one another. For example, the application information 1000 providing the QR code printing service includes: the processing flow information 1100 defining the sequential processing realizing the service, the application setup information 1200 defining various types of setup of the application information 1000; and the metadata information 1500 representing the metadata structure.

The application information 1000 may include two or more types of processing flow information 1100, two or more types of application setup information 1200, and two or more types of metadata information 1500.

The processing flow information 1100 is, as described above, information defining the sequential processing (processing flow) realizing the service provided through the application information 1000.

Furthermore, the application setup information 1200 is, as described above, information defining various types of setup of the application (application information 1000).

Furthermore, the metadata information 1500 is, as described above, information defining the metadata structure.

The application screen information storage unit 160 stores therein the application screen information 2000. The application screen information 2000 is stored in the application screen information storage unit 160, in association with the application ID.

The portal screen information storage unit 170 stores therein the portal screen information 3000. The portal screen information 3000 is stored in the portal screen information storage unit 170, in association with URLs of the portal top screen and application registration screen.

The input and output service processing unit 110, the Web service processing unit 120, the document service unit 130, and the portal service unit 140 may be respectively realized by different information processing apparatuses.

Figure 5:
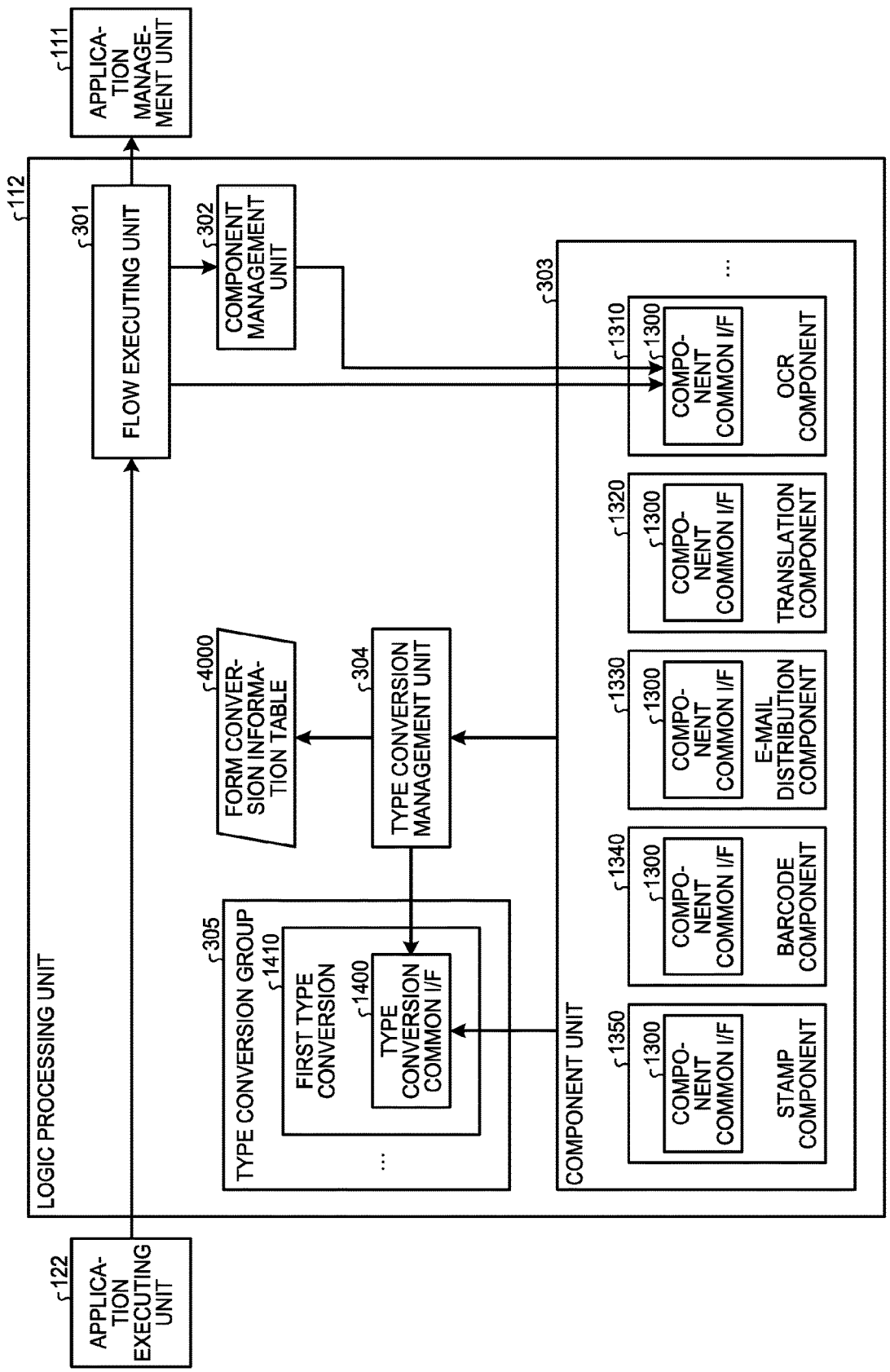
FIG. 5 is a diagram illustrating a functional configuration of an example of a logic processing unit according to the embodiment.

A detailed functional configuration of the logic processing unit 112 will be described while reference is made to FIG. 5. FIG. 5 is a diagram illustrating a functional configuration of an example of the logic processing unit 112 according to the embodiment.

The logic processing unit 112 illustrated in FIG. 5 has a flow executing unit 301, a component management unit 302, a component unit (a component group) 303, a type conversion management unit 304, and a type conversion group 305. Furthermore, the logic processing unit 112 has a type conversion information table 4000.

When the flow executing unit 301 receives an execution request for an application from the application executing unit 122, the flow executing unit 301 acquires the processing flow information 1100 corresponding to the execution request, from the application management unit 111. The flow executing unit 301 then executes sequential processing (a processing flow) based on the processing flow information 1100 acquired from the application management unit 111.

The sequential processing based on the processing flow information 1100 is executed by combination of components for executing different types of processing included in the sequential processing. The components are realized by programs or modules for executing processing realizing predetermined functions, and are defined by, for example, classes or functions.

The component management unit 302 manages the components. In response to a request from the flow executing unit 301, the component management unit 302 generates components, and sends back the generated components to the flow executing unit 301. The generation of components means loading, for example, components defined by classes or functions, into a memory (for example, the RAM 14).

The component group 303 is a group of components. The component group 303 according to the embodiment includes an OCR component 1310, a translation component 1320, an e-mail distribution component 1330, a barcode component 1340, and a stamp component 1350.

The OCR component 1310 is a component for OCR processing on an electronic file (image file). The OCR component 1310 performs the OCR processing on the electronic file by requesting the OCR processing unit 131 of the document service unit 130 for OCR processing.

The translation component 1320 is a component for translating a document, which is in an electronic file, such as a text file, and which is written in a predetermined language, into another language.

The e-mail distribution component 1330 is a component for distributing an e-mail to a specified e-mail address. The e-mail distribution component 1330 transmits the e-mail to the specified e-mail address by requesting the e-mail distribution unit 132 of the document service unit 130 for mail distribution processing.

The barcode component 1340 is a component for generating a QR code or the like, which includes predetermined information.

The stamp component 1350 is a component for incorporating the QR code generated by the barcode component 1340, into print data or the like.

As described above, each of these components executes processing realizing a predetermined function. The component group 303 may include, in addition to the above described components, various components, such as, for example: an encryption and decryption component for performing encryption or decryption of an electronic file; a compression component for compressing an electronic file; and an external service component for transmitting an electronic file to external service.

Furthermore, each of the components included in the component group 303 has a component common I/F 1300. The component common I/F 1300 is an application programming interface (API) defined commonly to these components, and includes an API for generating the component and an API for executing processing of the component.

Accordingly, by each of the components having the component common I/F 1300, influence associated with any addition of a component is able to be localized. That is, without influence on, for example, the flow executing unit 301 and the component management unit 302, addition of a component is able to be performed. As a result, the service providing system 10 according to the embodiment enables reduction in the number of manhours for development associated with any addition of a predetermined function (that is, addition of a component for executing processing realizing that function).

The type conversion management unit 304 manages type conversion of data types. A data type that is able to be handled by each of the components is determined beforehand. Therefore, according to a request from a component, the type conversion management unit 304 refers to, for example, the type conversion information table 4000 illustrated in FIG. 6, and generates a type conversion included in the type conversion group 305.

The type conversion management unit 304 then requests the generated type conversion to execute type conversion processing. The type conversion is realized by a program or a module that executes data type conversion processing, and is defined by, for example, a class or a function. Furthermore, the generation of a type conversion means, for example, loading a type conversion defined by a class or a function, into a memory (for example, into the RAM 14).

Examples of data types include: a data type, "InputStream", representing stream data; "LocalFilePath" representing a path (an address) of an electronic file stored in a storage device; and "File" representing entity of an electronic file.

The type conversion information table 4000 will now be described while reference is made to FIG. 6. FIG. 6 is a diagram illustrating an example of the type conversion information table 4000.

The type conversion information table 4000 illustrated in FIG. 6 has, as data items, data type before conversion, data type after conversion, and data type to be generated. That is, type conversion information stored in the type conversion information table 4000 is information having type conversions each associated with a set of a data type before conversion and a data type after conversion, the type conversion being for converting the data type before conversion into the data type after conversion.

The type conversion group 305 is a group of type conversions. The type conversion group 305 includes a first type conversion 1410 for converting the data type, "InputStream", into "LocalFilePath". The type conversion group 305 includes, in addition thereto, for example, a second type conversion for converting the data type, "LocalFilePath", into "File".

Furthermore, each of the type conversions included in the type conversion group 305 has a type conversion common I/F 1400. The type conversion common I/F 1400 is an API defined commonly to these type conversions, and includes an API for generating a type conversion and an API for executing type conversion processing of the type conversion.

Accordingly, by each of the type conversions having the type conversion common I/F 1400, influence associated with any addition of a type conversion is able to be localized. That is, without influence on, for example, the type conversion management unit 304, addition of a type conversion is able to be performed. As a result, the service providing system 10 according to the embodiment enables reduction in the number of manhours for development associated with any addition of a type conversion.

Details of Processing

Figure 7:
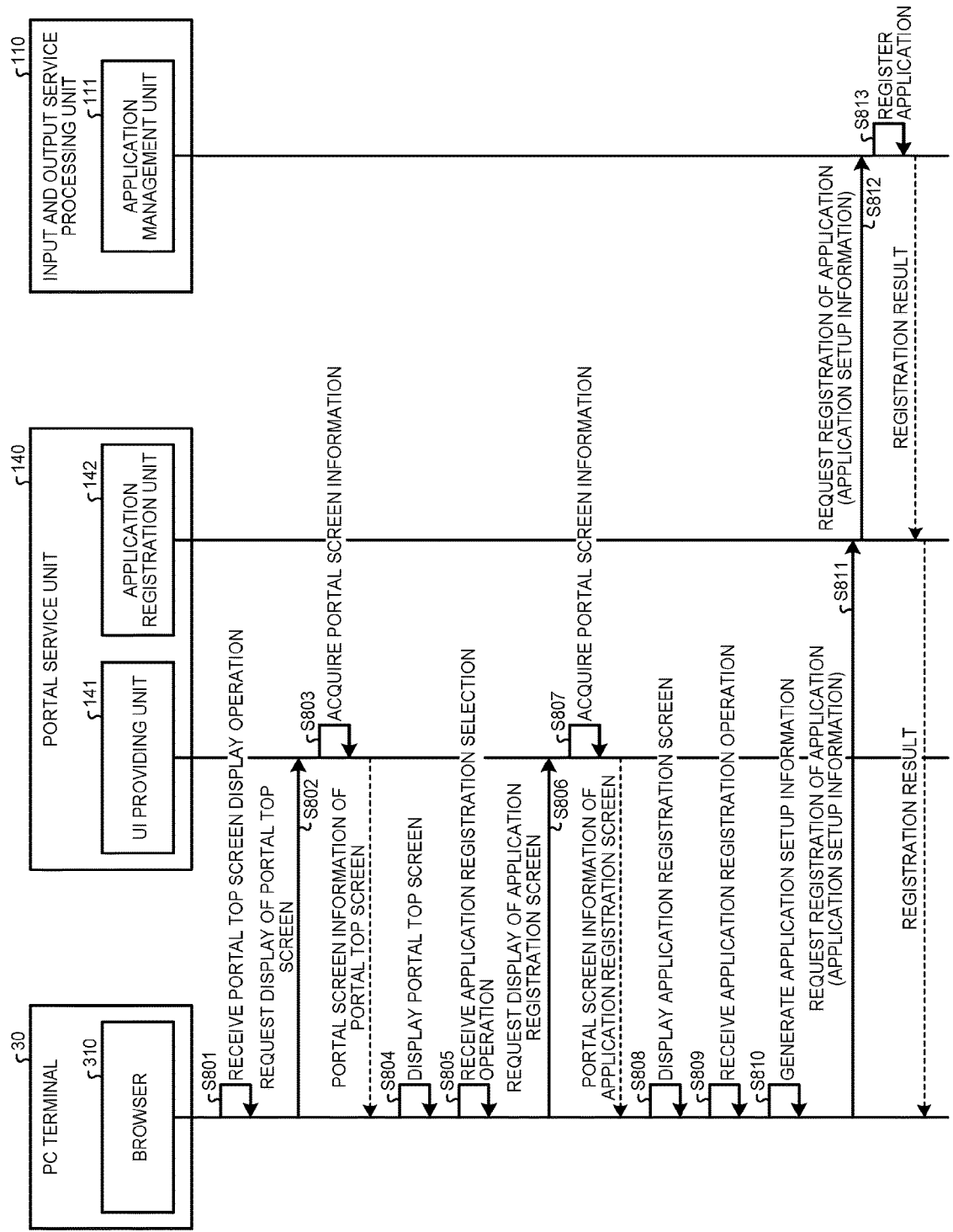
FIG. 7 is a sequence diagram illustrating an example of application registration processing according to the embodiment.

Next, details of processing by the information processing system 1 according to the embodiment will be described. Firstly, processing where a user of the PC terminal 30 registers an application realizing a desired processing flow, into the service providing system 10 will be described while reference is made to FIG. 7. FIG. 7 is a sequence diagram illustrating an example of application registration processing.

Firstly, the browser 310 of the PC terminal 30 receives operation for displaying a portal top screen (portal top screen display operation) (Step S801). For example, by entering a URL of a portal top screen in an address bar of the browser 310, a user of the PC terminal 30 is able to perform the portal top screen display operation.

When the browser 310 of the PC terminal 30 receives the portal top screen display operation, the browser 310 transmits a portal top screen display request, to the UI providing unit 141 of the portal service unit 40 (Step S802).

When the UI providing unit 141 of the portal service unit 140 receives the portal top screen display request, the UI providing unit 141 acquires portal screen information of the portal top screen, from the portal screen information storage unit 170 (Step S803). The UI providing unit 141 then sends back the portal screen information acquired from the portal screen information storage unit 170, to the browser 310.

Figure 8:
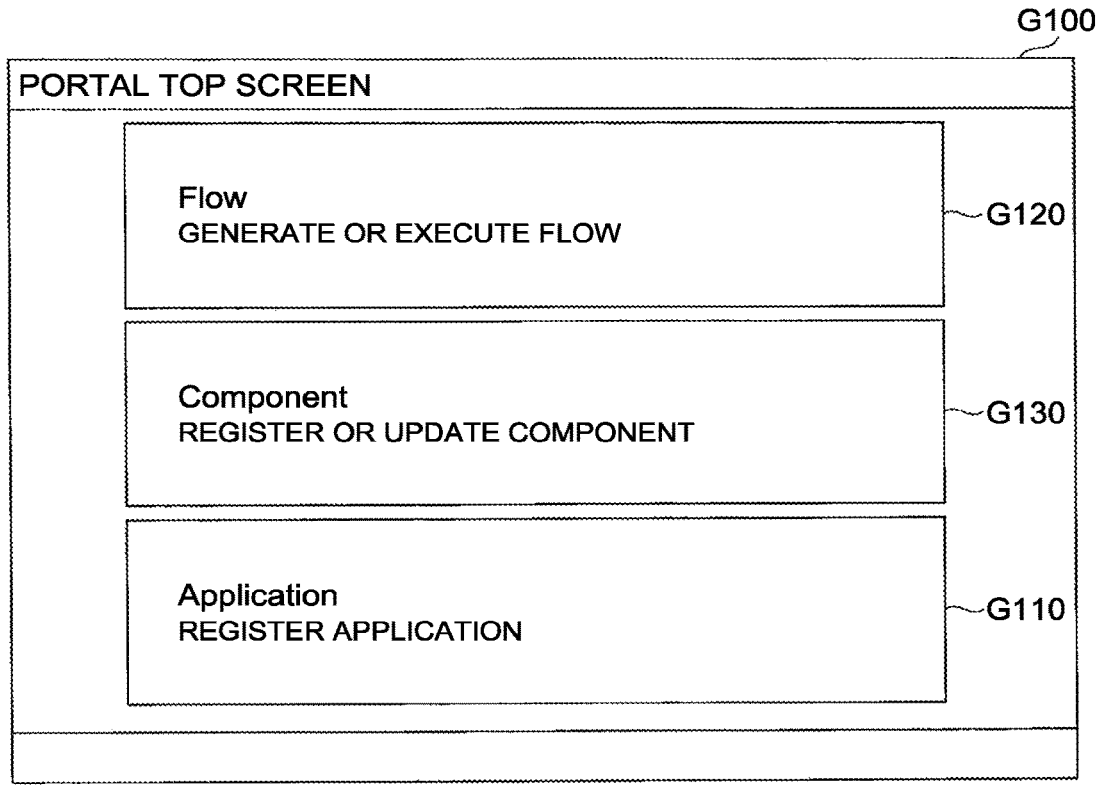
FIG. 8 is a diagram illustrating an example of a portal top screen according to the embodiment.

When the browser 310 of the PC terminal 30 receives the portal screen information of the portal top screen, the browser 310 displays, based on the portal screen information, for example, a portal top screen G100 illustrated in FIG. 8 (Step S804).

The portal top screen G100 illustrated in FIG. 8 is a top screen of a portal, and includes an "Application" button G110 for performing registration of an application. Hereinafter, it will be assumed that a user has performed operation of selecting the "Application" button G110 on the portal top screen 6100 illustrated in FIG. 8.

The portal top screen G100 illustrated in FIG. 8 also includes a "Flow" button 6120 for generating the processing flow information 1100, and a "Component" button G130 for registering a component. Accordingly, through the portal top screen 6100, in addition to the registration of applications, generation and execution of processing flows, and registration and update of components are able to be performed.

The browser 310 of the PC terminal 30 receives application registration selection operation performed by the user (Step S805).

When the browser 310 of the PC terminal 30 receives the application registration selection operation, the browser 310 transmits an application registration screen display request, to the UI providing unit 141 of the portal service unit 40 (Step S806).

When the UI providing unit 141 of the portal service unit 140 receives the application registration screen display request, the UI providing unit 141 acquires the portal screen information of the application registration screen, from the portal screen information storage unit 170 (Step S807). The UI providing unit 141 then sends back the portal screen information acquired from the portal screen information storage unit 170, to the browser 310.

Figure 9:
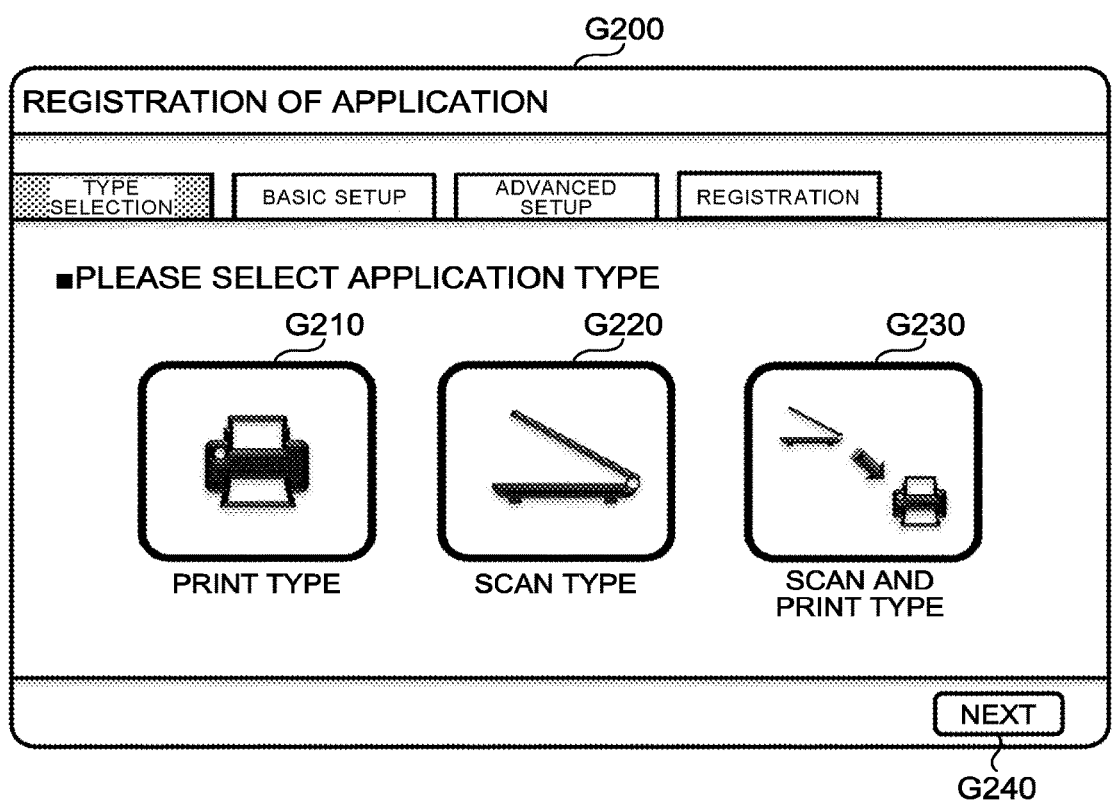
FIG. 9 is a diagram illustrating an example of a first application registration screen according to the embodiment.

When the browser 310 of the PC terminal 30 receives the portal screen information of the application registration screen, the browser 310 displays, based on the portal screen information, application registration screens G200, G300, and G400 illustrated in FIG. 9 to FIG. 11, and receives setup information input operation by the user. The browser 310 according to the embodiment displays the first application registration screen 6200 illustrated in FIG. 9 first, and starts selection of an application (Step S808). The first application registration screen 6200 is a screen for selecting a type of application registered by a user.

The first application registration screen G200 includes: a "Print Type" button G210 for registering an application of a print type; a "Scan Type" button G220 for registering an application of a scan type; and a "Scan and Print Type" button G230 for registering an application of a scan and print type. The application registration screen G200 illustrated in FIG. 9 may include, for example: a "FAX Type" button for registering an application of a FAX type, and an "E-mail Reception Type" button for registering an application of an e-mail reception type. Furthermore, the application registration screen G200 illustrated in FIG. 9 includes a "Next" button 6240 for transition to the next screen.

The print type is a type of application that causes an electronic file representing an execution result of sequential processing to be printed by an image forming apparatus. The scan type is a type of application that causes sequential processing to be executed, the sequential processing having an electronic file as input, the electronic file having been generated by scanning in an image forming apparatus. The scan and print type is a type of application that causes sequential processing to be executed, the sequential processing having, as input, an electronic file generated by scanning, and that causes an electronic file representing an execution result of the sequential processing to be printed. The FAX type is a type of application that causes an electronic file representing an execution result of sequential processing to be facsimiled by an image forming apparatus. The e-mail reception type is a type of application that causes sequential processing to be executed, the sequential processing having, as input, an electronic file attached to an e-mail received by an image forming apparatus.

Hereinafter, it will be assumed that a user has performed operation of pressing down the "Next" button G240 after selecting the "Scan and Print Type" button G230, on the first application registration screen G200. The browser 310 then receives the operation, and displays the second application registration screen G300 illustrated in FIG. 10.

The second application registration screen G300 includes: a scan setup entry field G310 where setup for execution of scanning (in this example, the sheet orientation, single side or double side, read color mode, read resolution, and read size) is entered; a setup changeability specification field G320 where whether or not content of the setup is to be made changeable by a user via the operating unit of the device 20 is specified; and a "Next" button G350 for transition to the next screen. When the user performs operation of pressing down the "Next" button G350, the browser 310 receives the operation and displays the third application registration screen 6400 illustrated in FIG. 11.

The third application registration screen G400 includes: a print setup entry field G410 where setup for execution of printing (in this example, the number of printed copies, print color mode, and printed side) is entered; a setup changeability specification field 6420 where whether or not content of the setup is to be made changeable by a user via the operating unit of the device 20 is specified; and a "Next" button 6450 for transition to the next screen.

When the browser 310 receives application registration operation via the application registration screens 6200, G300, and G400 as described above (Step S809), the browser 310 generates, based on setup information acquired by the registration operation, the application setup information (Step S810). The application setup information 1200 is information having an application type and a flow selected as described above, and any other appropriate information, associated with one another. FIG. 12 is a diagram illustrating an example of a data structure of the application setup information 1200 according to the embodiment.

When the browser 310 generates the application setup information 1200, the browser 310 transmits an application registration request, to the application registration unit 142 of the portal service unit 140 (Step S811). The application registration request includes the application setup information 1200 generated at Step S810.

When the application registration unit 142 of the portal service unit 140 receives the application registration request, the application registration unit 142 transmits the application registration request, to the application management unit 111 of the input and output service processing unit 110 (Step S812).

When the application management unit 111 of the input and output service processing unit 110 receives the application registration request, the application management unit 111 registers the application (Step S813). The application management unit 111 then sends back a registration result, to the browser 310.

That is, the application management unit 111 stores the application setup information 1200 included in the application registration request, in association with the application ID, into the application information storage unit 150. As a result, the application information 1000, which includes: the application setup information 1200; and the processing flow information 1100 of the flow name defined in a flow name 1205 of the application setup information 1200, is registered in the service providing system 10.

Accordingly, in the information processing system 1 according to the embodiment, by using the PC terminal 30, a user is able to register an application in the service providing system 10. What is more, in the information processing system 1 according to the embodiment, by using the PC terminal 30, a user is able to register an application (the application information 1000) easily by setting a flow name and parameter information of components.

Therefore, the information processing system 1 according to the embodiment enables, for example, even a user who does not have expert knowledge and experience of any programming language (for example, a person in charge of planning) to register an application (application information 1000) providing various types of service.

FIG. 13 is a sequence diagram illustrating an example of overall processing upon use of an application registered in the service providing system 10 according to the embodiment. Firstly, the browser 210 of the device 20 receives operation for displaying an application screen (display operation) corresponding to desired service (Step S1601).

When the browser 210 receives the application screen display operation for the service selected by a user, the browser 210 transmits a display request for the application screen for the service, to the screen configuring unit 121 of the Web service processing unit 120 (Step S1602). The display request includes the application ID of the application information 1000 that provides the selected service.

When the screen configuring unit 121 of the Web service processing unit 120 receives the display request for the application screen for the selected service, the screen configuring unit 121 transmits an application setup acquisition request, to the application management unit 111 of the input and output service processing unit 110 (Step S1603). The application setup acquisition request includes the application ID of the application information 1000 that provides the selected service.

When the application management unit 111 of the input and output service processing unit 110 receives the application setup acquisition request, the application management unit 111 acquires the application setup information 1200 stored in association with the application ID included in the application setup acquisition request, from the application information storage unit 150 (Step S1604). The application management unit 111 then sends back the application setup information 1200 acquired from the application information storage unit 150, to the screen configuring unit 121.

Subsequently, the screen configuring unit 121 of the Web service processing unit 120 acquires, from the application screen information storage unit 160, the application screen information 2000 stored in association with the application ID of the application information 1000 that provides the selected service (Step S1605). The screen configuring unit 121 then sends back the application screen information 2000 acquired from the application screen information storage unit 160, and the application setup information 1200 sent back at the above described Step S1604, to the browser 210.

Based on the application screen information 2000 and the application setup information 1200 received from the screen configuring unit 121, the browser 210 displays the application screen for the user using the device 20 to use the application corresponding to the selected service (Step S1606).

Figure 14:
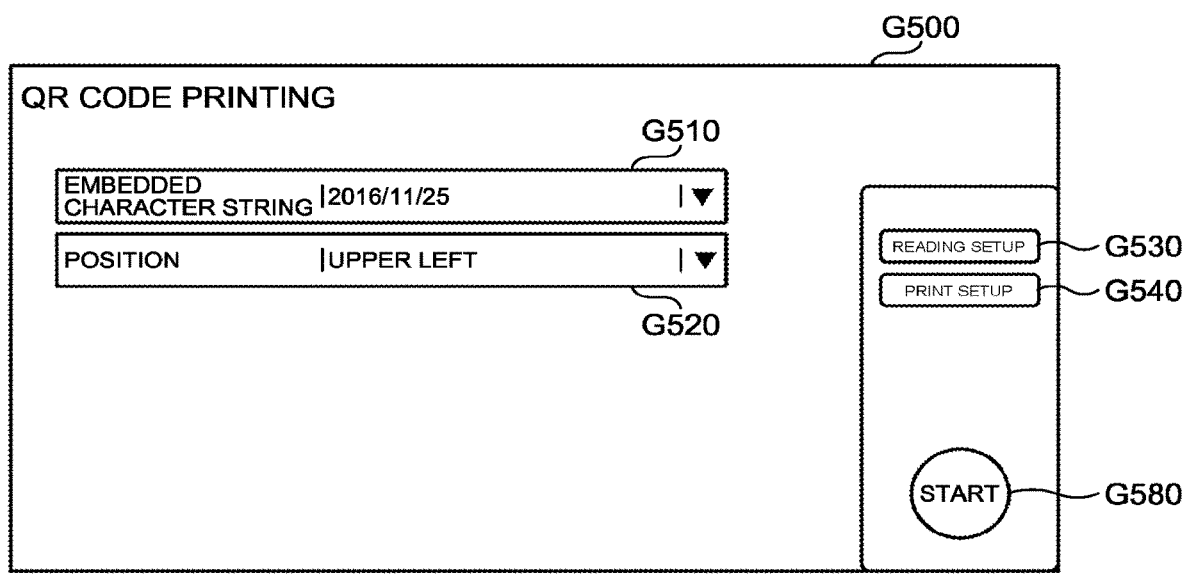
FIG. 14 is a diagram illustrating an example of an application screen upon use of a QR code (registered trademark) printing application, according to the embodiment.

FIG. 14 is a diagram illustrating an example of an application screen G500 for use of the QR code printing application according to the embodiment. The application screen G500 illustrated in FIG. 14 includes: a character string entry field G510 for entering a character string to be embedded in a QR code; a position specification field G520 for specifying a position on a print medium where the QR code is printed; a "Reading Setup" button 6530 for performing setup for reading; a "Print Setup" button G540 for performing setup for printing; and a "Start" button G580 for starting execution of the QR code printing application.

Accordingly, the application screen G500 according to the embodiment is configured, based on information defined in the application setup information 1200, such that various types of setup related QR code printing is able to be performed.

When operation (execution operation) of pressing down the "Start" button G580 on the application screen 6500 is performed, the browser 210 receives the execution operation (Step S1607).

When the browser 210 receives the execution operation, by controlling the scanner 26 and reading a document, the browser 210 generates an electronic file (image file) (Step S1608). When the electronic file (image file) has been generated, the browser 210 transmits an application execution request, to the application executing unit 122 of the Web service processing unit 120 (Step S1609). When the application executing unit 122 receives the application execution request, the application executing unit 122 transmits the application execution request, to the logic processing unit 112 of the input and output service processing unit 110 (Step S1610).

When the logic processing unit 112 of the input and output service processing unit 110 receives the application execution request, the logic processing unit 112 performs execution processing for the processing flow (Step S1611). That is, the logic processing unit 112 executes the processing flow based on the processing flow information 1100 of the flow name included in the application execution request.

The logic processing unit 112 then sends back a processing result of the execution processing for the processing flow, to the browser 210 via the Web service processing unit 120. As a result, the service providing system 10 according to the embodiment enables provision of service desired by a user.

Figure 15:
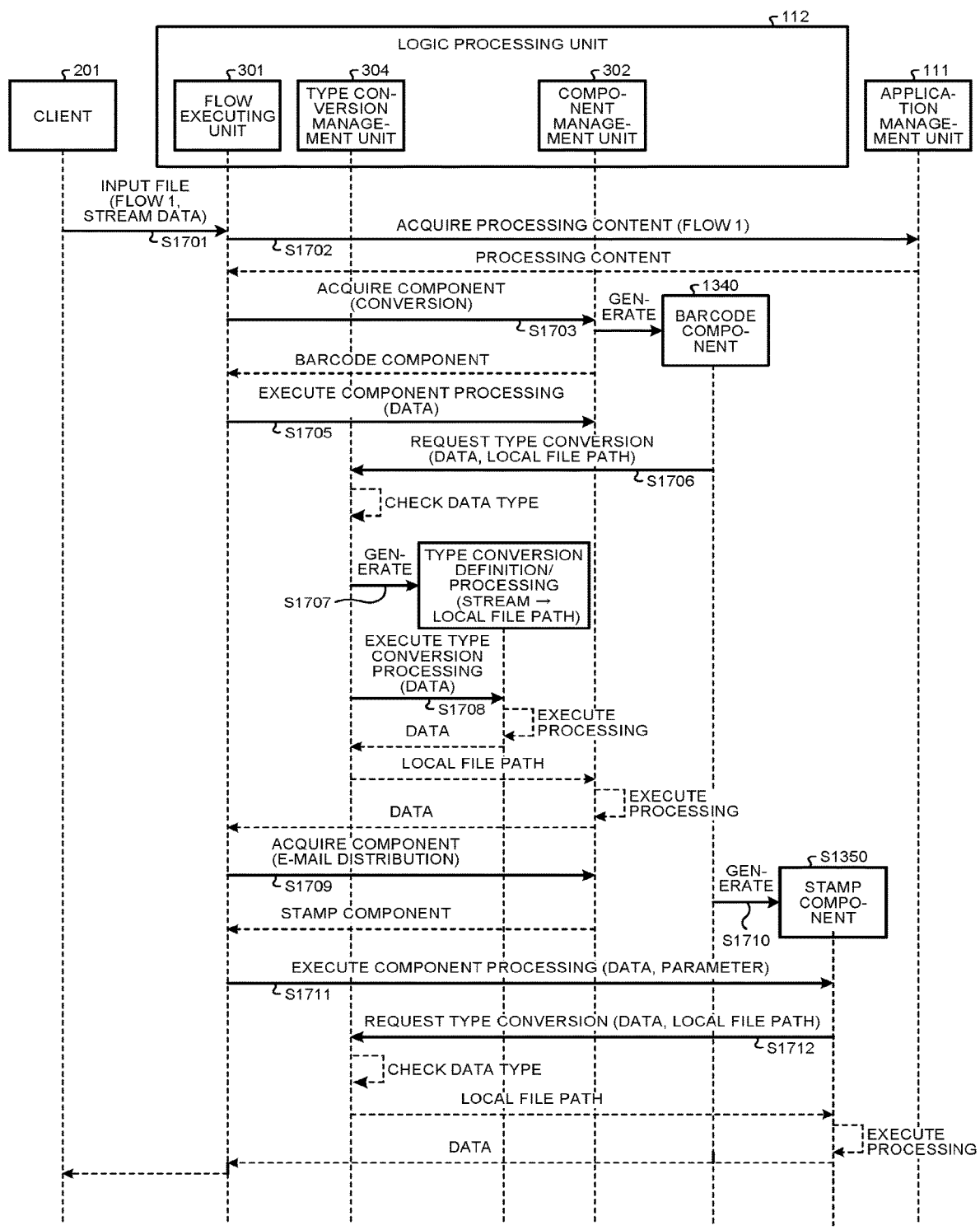
FIG. 15 is a sequence diagram illustrating an example of a processing flow in the QR code printing application according to the embodiment.

FIG. 15 is a sequence diagram illustrating an example of a processing flow in the QR code printing application according to the embodiment. A file (a flow 1, stream data) input from a client 201 is transmitted to the flow executing unit 301 of the logic processing unit 112 (S1701). The flow executing unit 301 acquires processing content (the flow 1) from the received file, and transmits the acquired processing content, to the application management unit 111 (S1702). The application management unit 111 sends back the processing content, to the flow executing unit 301.

When the flow executing unit 301 request the component management unit 302 for component acquisition (conversion) (S1703), the component management unit 302 generates a barcode component 1340 (S1704), and sends back the barcode component 1340 to the flow executing unit 301.

The flow executing unit 301 requests the barcode component 1340 for execution of component processing (data) (S1705). When the barcode component 1340 receives the request from the flow executing unit 301, the barcode component 1340 transmits a type conversion request (data, a local file path) to the type conversion management unit 304 (S1706). When the type conversion management unit 304 receives the type conversion request, the type conversion management unit 304 performs data type checking, and generates type conversion definition/processing (stream-→local file path) (S1707).

When the type conversion management unit 304 executes type conversion processing for the type conversion definition/processing 210 (S1708), the type conversion definition/processing 210 executes processing, and sends back the data to the type conversion management unit 304. Thereafter, the type conversion management unit 304 transmits the local file path, to the barcode component 1340, and when the barcode component 1340 receives the local file path, the barcode component 1340 executes processing and sends back the data to the flow executing unit 301.

When the flow executing unit 301 receives the data sent back from the barcode component 1340, the flow executing unit 301 requests the barcode component 1340 for component acquisition (e-mail distribution) (S1709). When the barcode component 1340 receives the request from the flow executing unit 301, the barcode component 1340 generates the stamp component 1350 (S1710), and sends back the stamp component 1350 to the flow executing unit 301.

The flow executing unit 301 requests the stamp component 1350 for execution of component processing (data, parameters) (S1711). When the stamp component 1350 receives the request from the flow executing unit 301, the stamp component 1350 transmits a type conversion request (data, a local file path) to the type conversion management unit 304 (S1712). When the type conversion management unit 304 receives the type conversion request, the type conversion management unit 304 performs data type checking, and sends back the local file path to the stamp component 1350. When the stamp component 1350 receives the local file path, the stamp component 1350 executes processing, and sends back the data to the client 201 via the flow executing unit 301.

Setup of Metadata Structure

Next, setup of a metadata structure will be described. Through an application that stores an electronic file (image data) generated by scanning, into external service, such as cloud storage; an electronic file is able to be uploaded with text data, such as characters and numbers, attached thereto as metadata. FIG. 16 is a diagram illustrating an example of a data structure of metadata 2500 in external service. The metadata structure is information related to a form or format of the metadata and data content thereof.

Through a scanning application that stores an electronic file into such external service, data having metadata attached to a scan result are able to be uploaded to the external service by, for example, selection of a category, or text input of remarks, on an application execution screen. Input of such metadata on the application execution screen is able to be realized by setup of a metadata structure upon generation of an application by an application generation tool that the service providing system 10 has.

However, with this application generation tool, the structure of metadata must be determined at the time of generation of the application, and thus if the metadata structure differs from user to user, an application needs to be generated individually for each metadata structure. The service providing system 10 according to the embodiment is thus more preferably configured to enable setup related to a metadata structure to be changed even after generation of the application, by including the application data management unit 180 having a function of managing a relation between a user and a metadata structure, and a relation between a metadata structure and an application.

Figure 17:
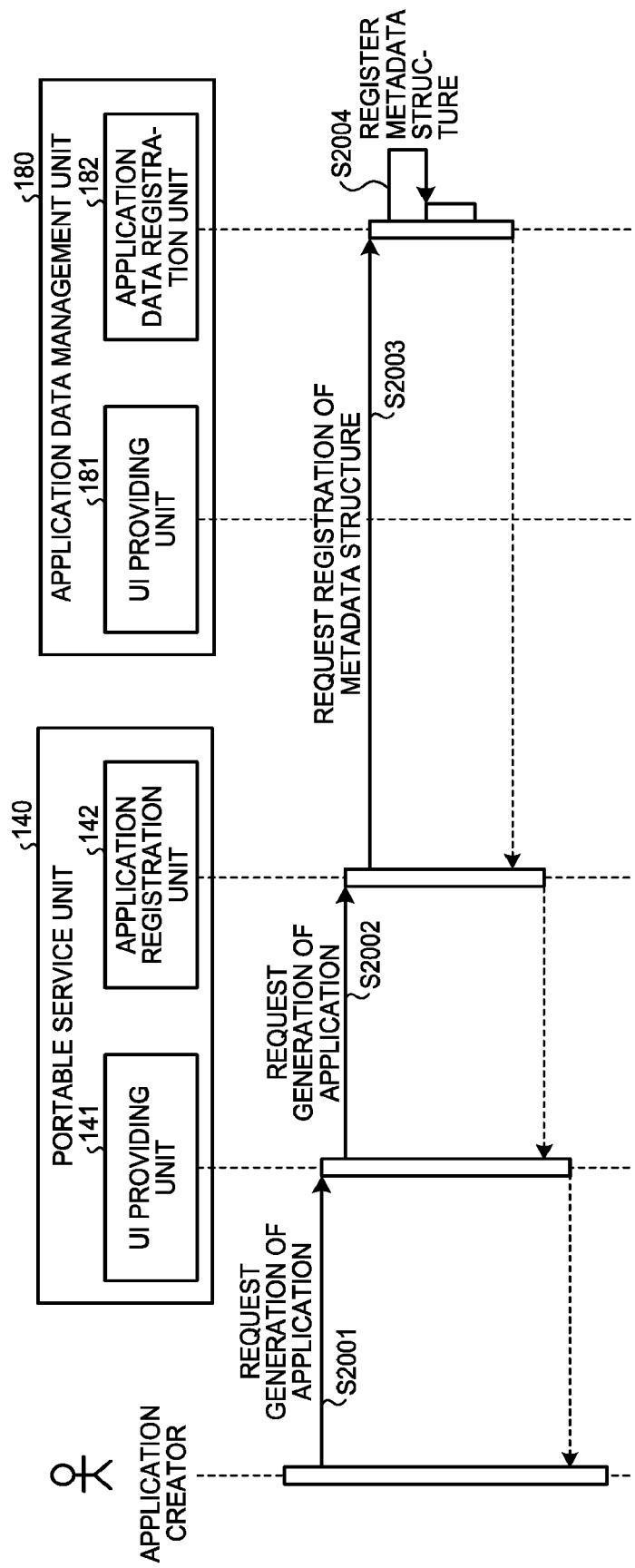
FIG. 17 is a sequence diagram illustrating an example of processing of registering a metadata structure in an application data management unit, according to the embodiment.

FIG. 17 is a sequence diagram illustrating an example of processing of registering a metadata structure in the application data management unit 180, according to the embodiment. Firstly, an application creator accesses the UI providing unit 141 of the portal service unit 140 via an appropriate information processing apparatus (such as the PC terminal 30), and requests for generation of an application (S2001). The request is transmitted to the application registration unit 142 (S2002), and if the application maintains the metadata structure setup, a metadata structure registration request is further transmitted to the application data registration unit 182 of the application data management unit 180 (S2003), and the application data registration unit 182 registers that metadata structure (S2004). As a result, the application data management unit 180 is enabled to refer to the metadata structure setup of each application.

Figure 18:
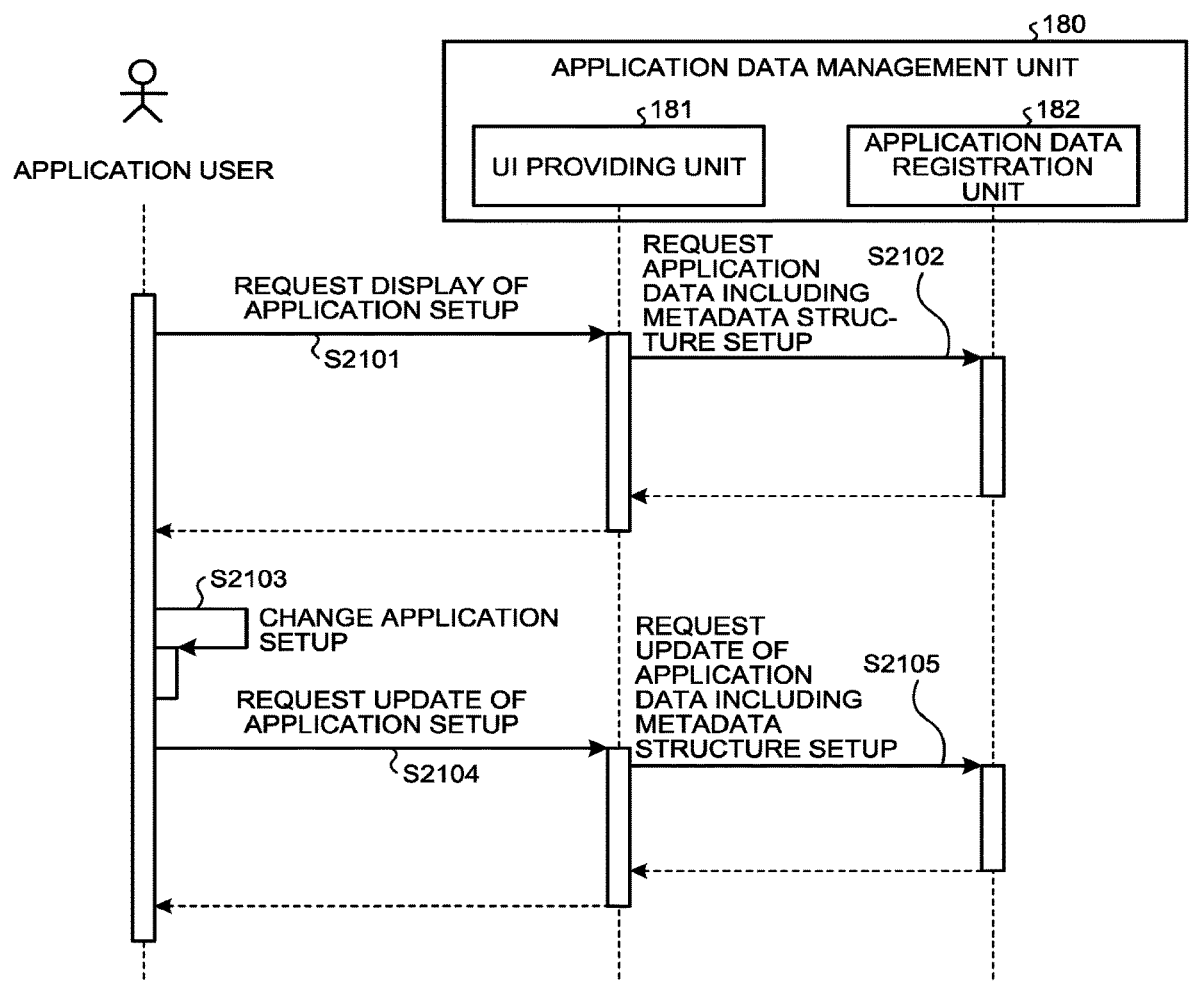
FIG. 18 is a sequence diagram illustrating an example of processing of updating application setup including metadata structure setup, according to the embodiment.

FIG. 18 is a sequence diagram illustrating an example of processing of updating application setup including metadata structure setup, according to the embodiment. Firstly, an application user accesses the UI providing unit 181 of the application data management unit 180 via an appropriate information processing apparatus (such as the device 20), and requests for display of application setup (S2101). Based on the request, the UI providing unit 181 transmits a request for application data including metadata structure setup, to the application data registration unit 182 (S2102). Based on the application data sent back from the application data registration unit 182, the UI providing unit 181 displays an application setup screen.

FIG. 19 is a diagram illustrating an example of a first application setup screen 6600 according to the embodiment. FIG. 20 is a diagram illustrating an example of a second application setup screen 6700 according to the embodiment.

The first application setup screen G600 includes: an "Edit Form" button G610 for changing setup of a metadata structure; an examiner entry field G620 for entering an examiner; an authorizer entry field G630 for entering an authorizer; a "Save" button G650 for saving the setup, and a "Cancel" button G660 for cancelling the setup.

The second application setup screen G700 is displayed when operation of pressing down the "Edit Form" button G610 on the first application setup screen 6600 has been performed. The second application setup screen G700 includes: a parameter setup entry section G710 for setting parameters forming a metadata structure; a "Set" button G750 for confirming content of the setup that has been entered; and a "Cancel" button 6760 for cancelling the setup.

The application user performs operation of changing application setup by using the above described application setup screens G600 and G700 (S2103), and requests update of the application setup including the metadata structure setup (S2104). When the UI providing unit 181 receives the request for update of the application setup, the UI providing unit 181 transmits an application data update request, to the application data registration unit 182 (S2105). As a result, application data including metadata structure setup set by the application user are able to be registered. FIG. 21 is a diagram illustrating an example (metadata structure setup information 2600) of metadata structure setup according to the embodiment.

Figure 22:
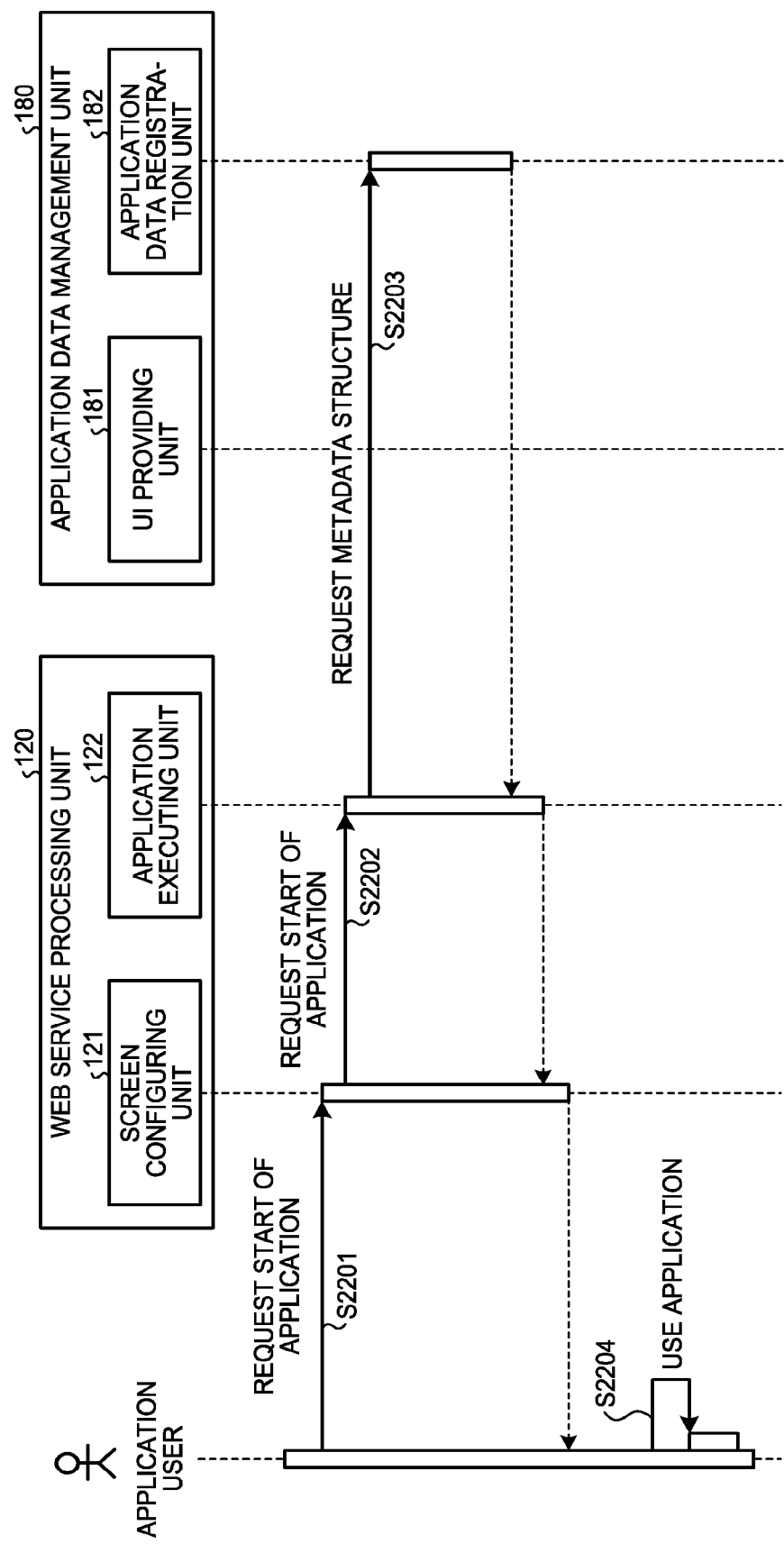
FIG. 22 is a sequence diagram illustrating an example of processing of using an application having its metadata structure registered in the application data management unit, according to the embodiment.

FIG. 22 is a sequence diagram illustrating an example of processing of using an application having its metadata structure registered in the application data management unit 180, according to the embodiment. When an application user requests start of an application via the operating unit of the device 20 (S2201), the request is transmitted to the application executing unit 122 via the screen configuring unit 121 of the Web service processing unit 120 (S2202). When the application executing unit 122 receives the application start request, the application executing unit 122 requests the application data registration unit 182 to refer to application data including the metadata structure setup (S2203). The application acquires the application data, a UI (a screen of the application) reflecting the metadata structure setup is constructed by the screen configuring unit 121, and the application user is enabled to use the application with the metadata setup according to each individual, the application user himself (S2204).

According the above described embodiment, even after an application has been generated, a user of the application is able to change or update a metadata structure thereof. As a result, an application no longer needs to be generated individually for each metadata structure. Furthermore, reworking for generation of an application due to erroneous input by an application developer is able to be prevented, and when metadata need to be changed or updated by an application user, the change or update is able to be performed without reliance on the application developer. As a result, setup related to applications and metadata is able to be performed flexibly.

First Modified Example

Hereinafter, a first modified example of the above described embodiment will be described. An application data management unit 180 according to this modified example is configured to be able to register plural metadata structures for the same external service for a single application.

Figure 23:
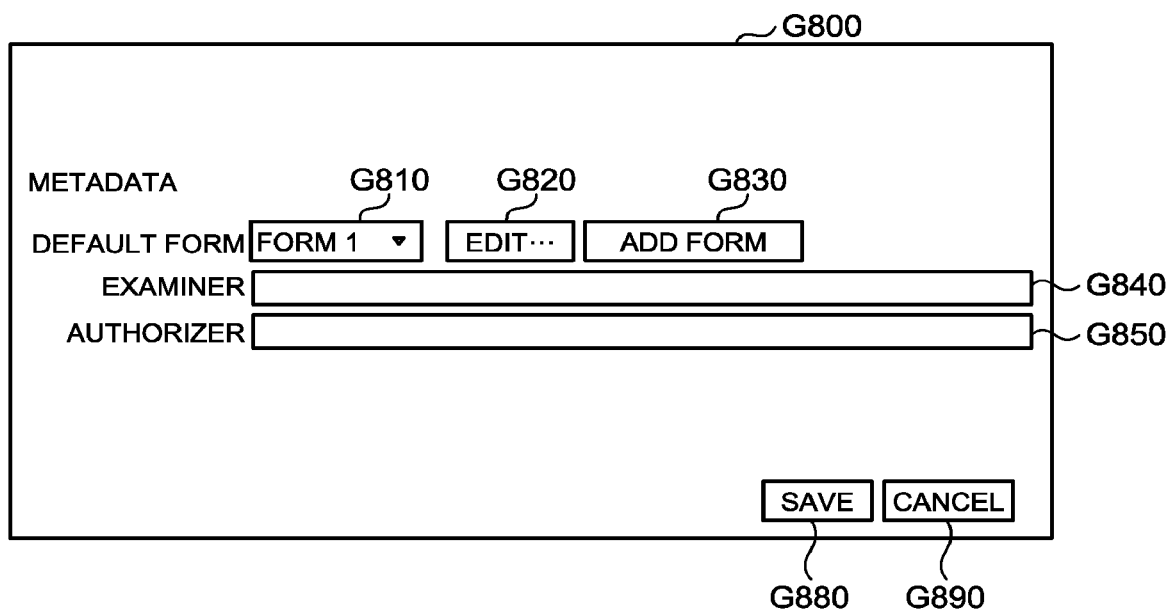
FIG. 23 is a diagram illustrating an example of an application setup screen according to a first modified example of the embodiment.

FIG. 23 is a diagram illustrating an example of an application setup screen 6800 according to the first modified example. The application setup screen G800 according to this modified example includes: a form selection section G810 for selecting one form from plural forms; an "Edit" button 6820 for changing setup of a metadata structure associated with the selected form; an "Add Form" button 6830 for adding a form; an examiner entry field G840 for entering an examiner; an authorizer entry field G850 for entering an authorizer; a "Save" button G880 for saving the setup; and a "Cancel" button 6890 for cancelling the setup.

An application user sets and registers a metadata structure for each form by using the above described application setup screen G800, thereby enabling the application user to select and use a desired metadata structure from plural metadata structures when the application user uses an application.

Second Modified Example

A service providing system 10 according to a second modified example has a means that acquires, from external service, a file (a metadata setup file) for setting up a metadata structure, and imports the acquired metadata setup file, to the application data management unit 180.

FIG. 24 is a sequence diagram illustrating an example of metadata structure registration processing upon registration of an application, according to the second modified example. Firstly, a user (an application developer or application user) requests, via an appropriate information processing apparatus (such as the device 20 or the PC terminal 30) the external service 500 to acquire a metadata setup file (S3001), and receives the metadata setup file sent back from the external service 500. Thereafter, when the user requests the UI providing unit 181 of the application data management unit 180 for acquisition of an application setup screen including registration of a metadata structure (S3002), the UI providing unit 181 causes, in response thereto, the information processing apparatus used by the user to display thereon the application setup screen.

When the user performs operation of importing the metadata setup file on the application setup screen (S3003), the UI providing unit 181 imports the metadata setup file to the application data registration unit 182 (S3004). When the application data registration unit 182 receives the metadata setup file, the application data registration unit 182 acquires metadata needed to set up the application (S3005), and sends back a result of processing thereof, to the UI providing unit 181. The UI providing unit 181 generates an application setup screen reflecting the result of the processing (S3006), and causes the information processing apparatus used by the user to display thereon the application setup screen. FIG. 25 is a diagram illustrating an example (application set up information 2700) of a data structure of processing result information upon import of a metadata setup file.

As described above, by adopting a configuration enabling import of a file for setting up a metadata structure, registration processing for a metadata structure is able to be performed even more conveniently, and the convenience is thus able to be improved.

Third Modified Example

A service providing system 10 according to a third modified example has a means that acquires external metadata information representing a metadata structure defined for each storage area in the external service 500, uses the external metadata information, and supports setup of metadata upon execution of an application (a processing flow) that has been registered beforehand. According to this modified example, it is assumed that the external service 500 provides a data sharing function for plural information processing apparatuses (such as the devices 20, or the PC terminals 30) to share various data, such as scan data. A Web service processing unit 120 according to this modified example generates, based on the acquired external metadata information, application screen information capable of supporting setup of metadata upon execution of the application.

FIG. 26 is a sequence diagram illustrating an example of metadata setup processing upon execution of an application, according to the third modified example. When a user (such as an application user) selects an application (a processing flow that has been registered beforehand) by operating the device 20 (S4001), the browser 210 of the device 20 requests the screen configuring unit 121 of the Web service processing unit 120 to display an application screen corresponding to the selected application (S4002).

Based on the display request from the browser 210, the screen configuring unit 121 requests the application management unit 111 of the input and output service processing unit 110 to acquire setup (application setup information 1200) corresponding to the application selected by the user (S4003). Based on the acquisition request from the screen configuring unit 121, the application management unit 111 acquires the appropriate application setup information 1200 from the application information storage unit 150 (S4004), and transmits the application setup information 1200 acquired, to the screen configuring unit 121 (S4005).

Based on the application setup information 1200 received from the application management unit 111, the screen configuring unit 121 acquires the application screen information 2000 from the application screen information storage unit 160 (S4006). The screen configuring unit 121 transmits the acquired application setup information 1200 and application screen information 2000, to the browser 210 of the device 20 (S4007). Based on the received application setup information 1200 and application screen information 2000, the browser 210 displays an application screen for executing the application selected by the user (S4008).

Figure 27:
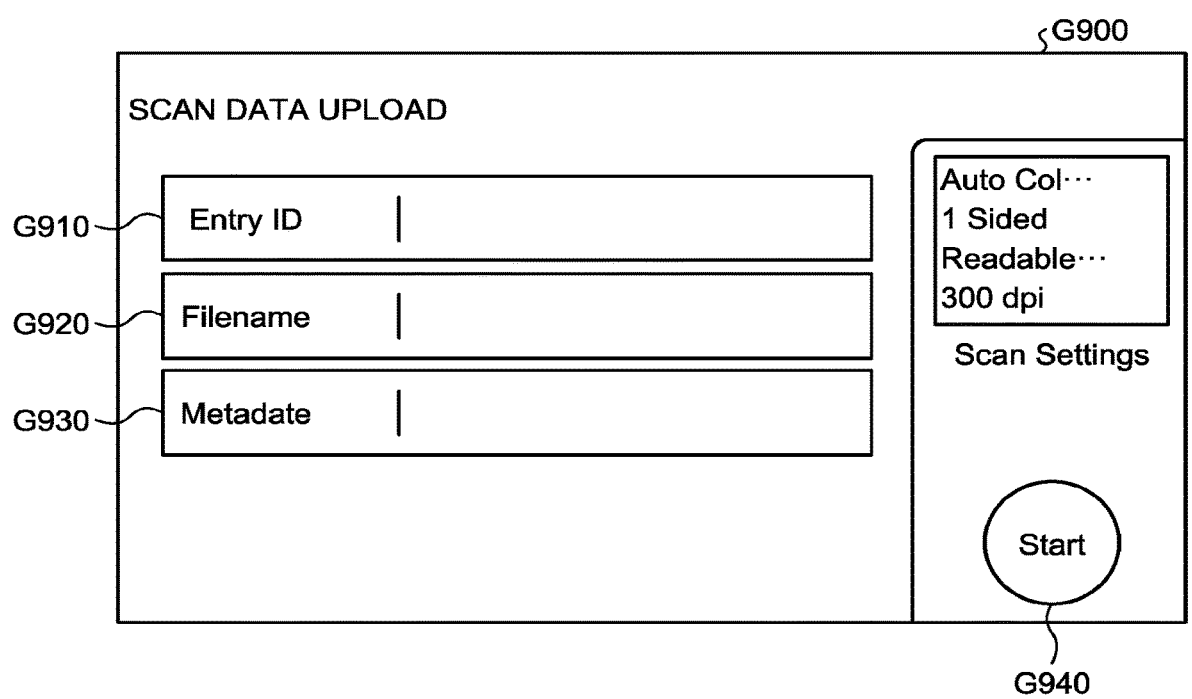
FIG. 27 is a diagram illustrating an example of an application screen upon use of a scan data uploading application, according to the third modified example of the embodiment.

FIG. 27 is a diagram illustrating an example of an application screen G900 for use of a scan data uploading application, according to the third modified example. An application (a processing flow) according to this modified example is a scan data uploading application for uploading image data (a file) to a library (distribution destination folder) of the external service 500, the image data having been acquired by scanning an image with a scanner. The application screen G900 illustrated in FIG. 27 includes: a distribution destination setup section G910 for setting a distribution destination folder; a file name setup section G920 for setting a file name of a file to be uploaded; a metadata setup section G930 for setting metadata attached to the file when the file is uploaded; and a "Start" button G940 for starting uploading of the file.

FIG. 28 is a diagram illustrating an example of an external service screen 61000 representing a metadata structure for the external service 500, according to the third modified example. The external service screen G1000 includes a library display section G1010, a distribution destination folder display section G1020, and a metadata display section G1030. The metadata display section G1030 includes a default definition section G1050, a user definition section G1060, and a changing section G1070.

The external service screen G1000 illustrated in FIG. 28 illustrates that for a "Healthcare" library, a metadata structure has been defined, the metadata structure being formed of five sets of metadata, which are: "Modified" indicating dates when files were uploaded; "Modified By" indicating users who uploaded the files; "PatientID" identifying patients; "Department" identifying medical departments; and "DocumentType" identifying types of the files. Among these five sets of metadata, "Modified" and "Modified By" are common to all libraries, and "PatientID", "Department", and "DocumentType" are able to be arbitrarily changed by a user (such as an administrator of the external service 500) operating the changing section 61070.

According to this modified example, a metadata structure as described above has been defined for each library. For example, a metadata structure different from that of the "Healthcare" library has been set for an "Invoice" library. For the "Invoice" library, for example, a metadata structure formed of "Modified", "Modified By", "InvoiceNumber" indicating invoice numbers, "Vendor" identifying vendors, and "DepartmentCode" identifying departments may have been defined.

As illustrated in FIG. 26, when a user selects a distribution destination folder (including a library) by operating the library display section 61010 on the external service screen G1000 (S4009), the browser 210 requests the screen configuring unit 121 of the Web service processing unit 120 to set the distribution destination folder selected by the user (S4010). Based on the request from the browser 210, the screen configuring unit 121 updates the application screen information 2000 on the application screen G900 such that the selected distribution destination folder is brought into a state of having been set (S4011), and transmits the updated application screen information 2000 to the browser 210 (S4012). Based on the updated application screen information 2000, the browser 210 displays the application screen G900 where the selected distribution destination folder is in the state of having been set (S4013).

Thereafter, via the application screen 6900 being displayed on the browser 210, the user performs operation for setting metadata corresponding to the library that the distribution destination folder selected at Step S4009 belongs to (S4014). According to the operation by the user, the browser 210 requests the screen configuring unit 121 of the Web service processing unit 120 to set up metadata corresponding to the library that the selected distribution destination folder belongs to (S4015). Based on the request from the browser 210, the screen configuring unit 121 requests the logic processing unit 112 of the input and output service processing unit 110 to acquire external metadata information representing a metadata structure defined for the library that the selected distribution destination folder belongs to (S4016).

Based on the request from the screen configuring unit 121, the logic processing unit 112 acquires (imports), from the external service 500, the external metadata information representing the metadata structure defined for the library that the selected distribution destination folder belongs to (S4017), and transmits the acquired external metadata information, to the screen configuring unit 121 (S4018). Based on the external metadata information received from the logic processing unit 112, the screen configuring unit 121 generates the application screen information 2000 forming an application screen G900 having the metadata set up, the metadata corresponding to the library that the selected distribution destination folder belongs to, and transmits the generated application screen information 2000, to the browser 210 (S4019). Based on the application screen information received from the screen configuring unit 121, the browser 210 displays the application screen G900 having the metadata set up, the metadata corresponding to the library that the selected distribution destination folder belongs to (S4020).

Figure 29:
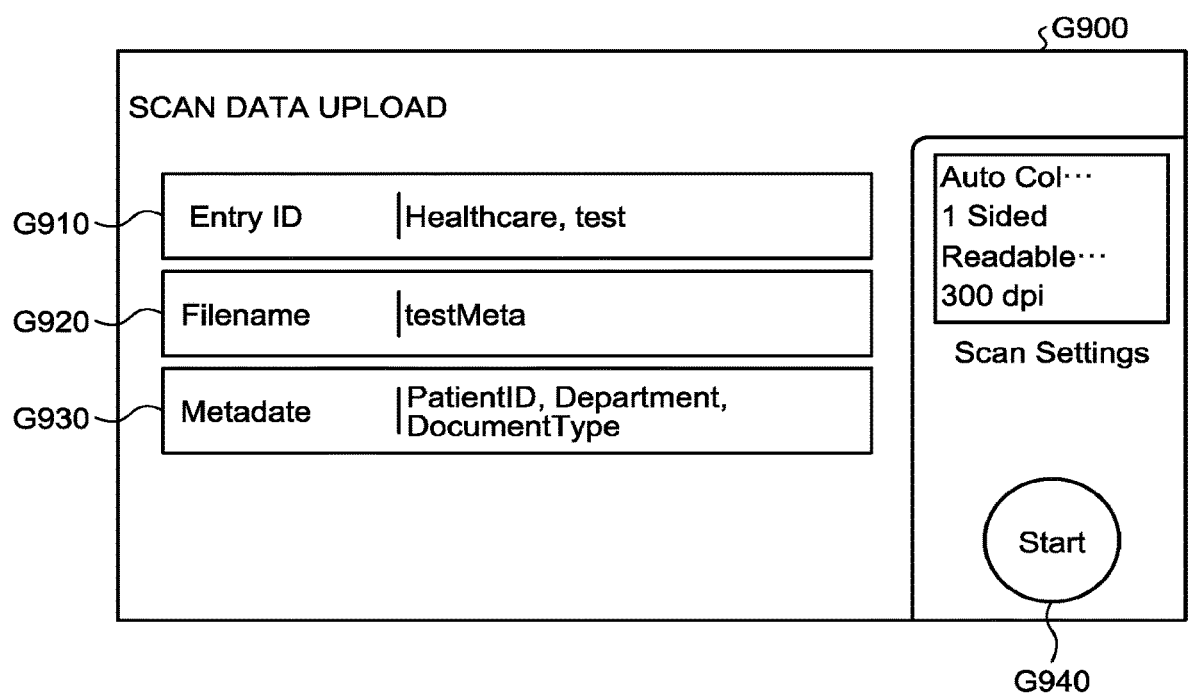
FIG. 29 is a diagram illustrating a first example of a state where metadata have been set up on the application screen, according to the third modified example of the embodiment.
Figure 30:
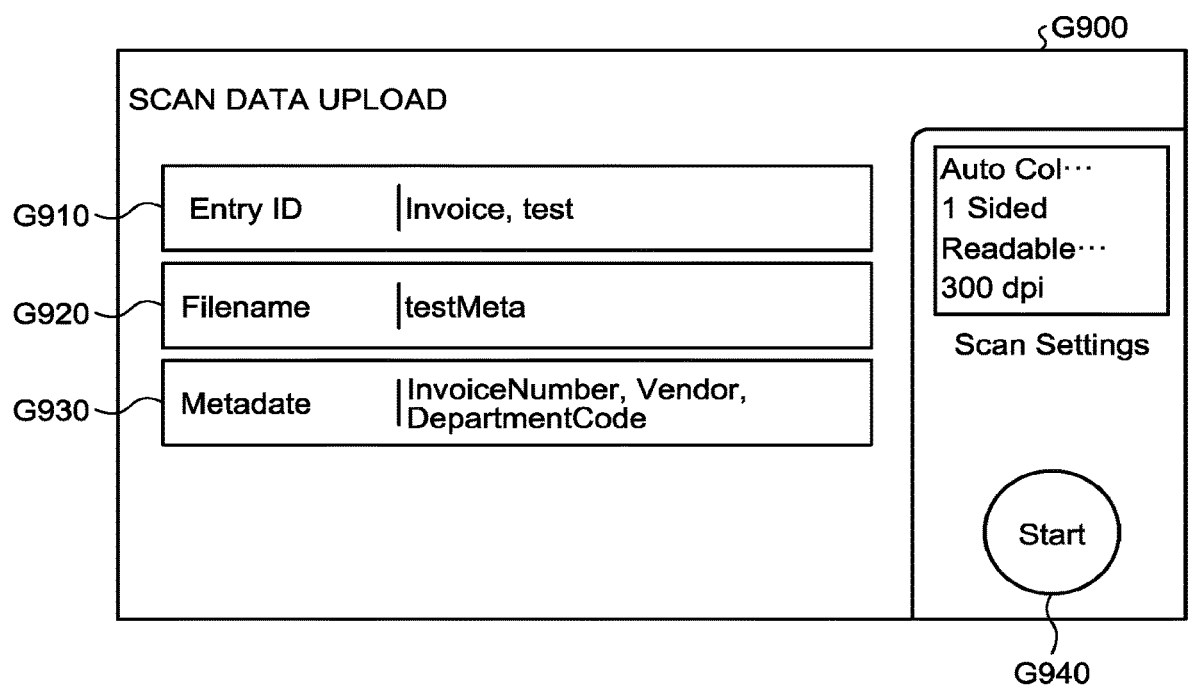
FIG. 30 is a diagram illustrating a second example of the state where the metadata have been set up on the application screen, according to the third modified example of the embodiment.

FIG. 29 is a diagram illustrating a first example of the state where the metadata have been set up on the application screen 6900, according to the third modified example. FIG. 30 is a diagram illustrating a second example of the state where the metadata have been set up on the application screen G900, according to the third modified example.

The first example illustrated in FIG. 29 represents a state where a "test" folder in a "Healthcare" library has been selected as a distribution destination folder, and "PatientID", "Department", and "DocumentType" have been set as metadata that are able to be defined by a user. The second example illustrated in FIG. 30 represents a state where a "test" folder in an "Invoice" library has been selected as a distribution destination folder, and "InvoiceNumber", "Vendor", and "DepartmentCode" have been set as metadata that are able to be defined by a user. The above described setup of metadata may be performed automatically by, for example, a user performing operation of clicking the metadata setup section G930 on the screen after entering desired library and folder in the distribution destination setup section G910 on the application screen G900. Furthermore, metadata may be acquired and set up by a user entering or selecting desired library and folder in the distribution destination setup section G901 on the application screen G900.

As described above, by use of external metadata information indicating a metadata structure defined for the external service 500, setup of metadata upon execution of an application is able to be performed more conveniently, and the convenience is thus able to be improved.

The embodiment enables, in a system that executes a processing flow where functions of a device are used, flexible setup related to metadata used in an application that executes the processing flow.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system, comprising:
   a device configured to perform predetermined functions; and
   a service providing system that executes an application to execute one or more of the predetermined functions of the device, wherein the service providing system includes:
   processing circuitry configured to
      register application information having metadata structure information associated with the application, the metadata structure information being set, via a first user interface, by a user who uses the application, wherein a second user interface of the application is defined in part by the metadata structure information and is used to set metadata for the application when the application is executed, and
      generate, when the application is executed, based on the registered application information, the second user interface, the second user interface being configured to receive, from the user, a metadata setup operation performed by the user to set the metadata corresponding to the metadata structure information set by the user via the first user interface and included in the registered application information for the application.

2. The information processing system according to claim 1, wherein
   the processing circuitry is further configured to register, based on a metadata structure setup operation performed by the user via the first user interface, updated content for the metadata structure information included in the registered application information.

3. The information processing system according to claim 1, wherein
   the application information for the application is associated with plural pieces of metadata information; and
   the second user interface is configured to enable the user to select a desired one of the plural pieces of metadata information when the application is executed.

4. The information processing system according to claim 1, wherein the processing circuitry is further configured to import information for setting up the metadata structure information from an external service, and perform setup related to the metadata structure information by using the imported information.

5. The information processing system according to claim 1, wherein the processing circuitry is further configured to import external metadata structure information defined for each storage area in an external service, and
   generate, based on the external metadata structure information, the second user interface, which allows the user to set metadata for each storage area.

6. The information processing system of claim 1, wherein the processing circuitry is further configured to generate the first user interface, which is configured to receive, from the user, instructions to update the registered metadata structure information for the application.

7. The information processing system of claim 1, wherein the processing circuitry is further configured to display the first user interface, which allows the user to set parameters defining the metadata structure information, which defines in part an arrangement of the second user interface, which is used to set the metadata.

8. The information processing system of claim 1, wherein the metadata structure information includes at least one of a form, a format, and data content of the metadata, and
- a device application of the device is configured to transmit, to external service different from the service providing system, the metadata along with image data generated by scanning using the device.

9. An information processing method of executing an application to execute one or more functions of a device, the information processing method comprising:
- registering application information having metadata structure information associated with the application, the metadata structure information being set, via a first user interface, by a user who uses the application, wherein a second user interface of the application is defined in part by the metadata structure information and is used to set metadata for the application when the application is executed; and
- generating, when the application is executed, based on the registered application information, the second user interface, the second user interface being configured to receive, from the user, a metadata setup operation performed by the user to set the metadata corresponding to the metadata structure information set by the user via the first user interface and included in the registered application information for the application.

10. A non-transitory computer-readable recording medium that contains a computer program that causes a computer, which executes an application to execute one or more functions of a device, to execute processing including:
- registering application information having metadata structure information associated with the application, the metadata structure information being set, via a first user interface, by a user who uses the application, wherein a second user interface of the application is defined in part by the metadata structure information and is used to set metadata for the application when the application is executed; and
- generating, when the application is executed, based on the registered application information, the second user interface, the second user interface being configured to receive, from the user, a metadata setup operation performed by the user to set the metadata corresponding to the metadata structure information set by the user via the first user interface and included in the registered application information for the application.

* * * * *